(12) United States Patent
Chen et al.

(10) Patent No.: US 12,399,257 B2
(45) Date of Patent: Aug. 26, 2025

(54) LIDAR AND DETECTION APPARATUS THEREOF

(71) Applicant: Hesai Technology Co., Ltd., Shanghai (CN)

(72) Inventors: Jie Chen, Shanghai (CN); Linsen Ding, Shanghai (CN); Yongji Mu, Shanghai (CN); Shaoqing Xiang, Shanghai (CN)

(73) Assignee: Hesai Technology Co., Ltd., Shanghai (CN)

( * ) Notice: Subject to any disclaimer, the term of this patent is extended or adjusted under 35 U.S.C. 154(b) by 848 days.

(21) Appl. No.: 17/404,840

(22) Filed: Aug. 17, 2021

(65) Prior Publication Data

US 2021/0382147 A1 Dec. 9, 2021

Related U.S. Application Data

(63) Continuation of application No. PCT/CN2019/103853, filed on Aug. 30, 2019.

(30) Foreign Application Priority Data

Apr. 26, 2019 (CN) .......................... 201910344752.2
Aug. 8, 2019 (CN) .......................... 201910731061.8

(51) Int. Cl.
*G01S 7/481* (2006.01)
*G01S 17/08* (2006.01)

(52) U.S. Cl.
CPC .......... *G01S 7/4813* (2013.01); *G01S 7/4817* (2013.01); *G01S 17/08* (2013.01)

(58) Field of Classification Search
CPC ...... G01S 7/4813; G01S 7/4817; G01S 17/08; G01S 17/89
See application file for complete search history.

(56) References Cited

U.S. PATENT DOCUMENTS 7,969,558 B2 6/2011 Hall
8,767,190 B2 7/2014 Hall
(Continued)

FOREIGN PATENT DOCUMENTS

CN 105785381 A 7/2016
CN 106066475 11/2016
(Continued)

OTHER PUBLICATIONS

CN-109375234-A English (Year: 2019).*

(Continued)

*Primary Examiner* — Yuqing Xiao
*Assistant Examiner* — Jempson Noel
(74) *Attorney, Agent, or Firm* — Fish & Richardson P.C.

(57) ABSTRACT

A LiDAR includes a flat platform and a detection device rotatably fixed on the flat platform. The detection device includes: a lens tube, a light beam emitting device, an emitting lens assembly, a receiving lens assembly, and a photoelectric processing device. The emitting lens assembly is located on a path of a detection light beam emitted by the light beam emitting device. The receiving lens assembly is located on a path of an echo light beam received by the photoelectric processing device. The lens tube includes an emitting support and a receiving support that are separable and extend in directions parallel to each other, and the emitting lens assembly is located inside the emitting support and the receiving lens assembly is located inside the receiving support, such that an exiting direction of the detection light beam and an incident direction of the echo light beam are parallel to each other.

23 Claims, 21 Drawing Sheets

(56) References Cited

U.S. PATENT DOCUMENTS

| | | | |
|---|---|---|---|
| 9,992,477 | B2 | 6/2018 | Pacala et al. |
| 10,036,803 | B2* | 7/2018 | Pacala .................. G01S 17/42 |
| 10,317,529 | B2 | 6/2019 | Shu et al. |
| 10,481,269 | B2* | 11/2019 | Pacala ................. H05K 5/0004 |
| 10,527,725 | B2 | 1/2020 | Pacala et al. |
| 10,557,750 | B2 | 2/2020 | Pacala et al. |
| 10,591,740 | B2* | 3/2020 | McMichael ........ G02B 27/0955 |
| 10,948,572 | B2 | 3/2021 | Pacala et al. |
| 10,969,490 | B2 | 4/2021 | Pacala et al. |
| 12,123,977 | B2* | 10/2024 | Liu ....................... G01S 7/4817 |
| 2012/0298872 | A1* | 11/2012 | Tang ..................... G01S 17/04 250/353 |
| 2013/0135605 | A1* | 5/2013 | Wada ................... G01S 17/48 356/4.01 |
| 2014/0111812 | A1* | 4/2014 | Baeg ..................... G01S 17/87 356/610 |
| 2014/0211194 | A1 | 7/2014 | Pacala et al. |
| 2016/0187131 | A1* | 6/2016 | Chang ................... G02B 23/14 356/4.01 |
| 2016/0282453 | A1* | 9/2016 | Pennecot .............. G02B 27/62 |
| 2018/0003823 | A1* | 1/2018 | Yan ...................... G01S 7/4811 |
| 2018/0051979 | A1* | 2/2018 | Chung ................. G01B 11/002 |
| 2018/0172803 | A1 | 6/2018 | Liang et al. |
| 2018/0210072 | A1 | 7/2018 | Yu |
| 2018/0329035 | A1 | 11/2018 | Pacala et al. |
| 2019/0098233 | A1 | 3/2019 | Gassend et al. |
| 2019/0317192 | A1* | 10/2019 | Wang ..................... G01S 7/003 |
| 2020/0209355 | A1 | 7/2020 | Pacala et al. |

FOREIGN PATENT DOCUMENTS

| | | | |
|---|---|---|---|
| CN | 106383353 | A | 2/2017 |
| CN | 106405567 | | 2/2017 |
| CN | 107271983 | A | 10/2017 |
| CN | 206977289 | U | 2/2018 |
| CN | 207516546 | U | 6/2018 |
| CN | 108267751 | | 7/2018 |
| CN | 108318874 | A | 7/2018 |
| CN | 108398696 | A | 8/2018 |
| CN | 207717978 | U | 8/2018 |
| CN | 207780229 | U | 8/2018 |
| CN | 108828558 | A | 10/2018 |
| CN | 108957424 | A | 12/2018 |
| CN | 208239615 | U | 12/2018 |
| CN | 109188450 | A * | 1/2019 |
| CN | 208314210 | | 1/2019 |
| CN | 109343067 | A | 2/2019 |
| CN | 109375234 | A * | 2/2019 |
| CN | 109387819 | | 2/2019 |
| CN | 208547711 | U | 2/2019 |
| CN | 109444908 | | 3/2019 |
| CN | 109597050 | | 4/2019 |
| CN | 208766302 | U | 4/2019 |
| CN | 109991617 | A | 7/2019 |
| CN | 110376597 | | 10/2019 |
| CN | 110376597 | A | 10/2019 |
| CN | 210136310 | U | 3/2020 |
| CN | 113348382 | A | 9/2021 |
| CN | 113640814 | A | 11/2021 |
| CN | 113640815 | A | 11/2021 |
| CN | 113866784 | A | 12/2021 |
| JP | 2013-130422 | | 7/2013 |
| KR | 101947404 | B1 | 2/2019 |
| WO | WO 2012/144341 | | 10/2012 |
| WO | WO 2018/056516 | | 3/2018 |
| WO | WO 2018124413 | A1 | 7/2018 |
| WO | WO 2018/176972 | A1 | 10/2018 |
| WO | WO 2018223821 | A1 | 12/2018 |
| WO | WO 2019/067068 | A1 | 4/2019 |
| WO | WO 2020033749 | A1 | 2/2020 |
| WO | WO 2020215577 | A1 | 10/2020 |

OTHER PUBLICATIONS

CN-109188450-A English (Year: 2019).*
International Preliminary Report on Patentability in Appln. No. PCT/CN2019/103853, mailed on Nov. 4, 2021, 13 pages (with English translation).
Notice of Allowance in Chinese Appln. No. 202111141058.4, mailed on Dec. 28, 2022, 3 pages (with English translation).
Office Action in Chinese Appln. No. 202111141058.4, mailed on Aug. 26, 2022, 22 pages (with English translation and English Search Report).
European Patent Office, Supplementary European Search Report in European Patent Application No. 19926538.0 (Feb. 11, 2022).
Hongzhi et al., "Design and Optimization of All-Fiber Lidar Transmitting and Receiving Optical Systems," *Acta Optica Sinica*, 36(11): 1106005-1-1106005-8 (2016).
López et al., "Planar-lens Enabled Beam Steering for Chip-scale LIDAR," *Optical Society of America Conference on Lasers and Electro-Optics*, Paper SM3I.1 (2018) [Abstract].
China National Intellectual Property Administration, Office Action in Chinese Patent Application No. 201910344752.2 (Oct. 18, 2019).
China National Intellectual Property Administration, Second Office Action in Chinese Patent Application No. 201910344752.2 (Feb. 25, 2020).
China National Intellectual Property Administration, Search Report in Chinese Patent Application No. 201910344752.2 (Oct. 18, 2019).
China National Intellectual Property Administration, Office Action in Chinese Patent Application No. 201910731061.8 (Dec. 3, 2020).
China National Intellectual Property Administration, Search Report in Chinese Patent Application No. 201910731061.8 (Dec. 3, 2020).
China National Intellectual Property Administration, Second Office Action in Chinese Patent Application No. 201910731061.8 (Apr. 8, 2021).
China National Intellectual Property Administration, International Search Report in International Patent Application No. PCT/CN2019/103583 (Feb. 1, 2020).
Examination Report in European Patent Application No. 19926538.0, mailed on Apr. 5, 2023, 6 pages.
Notification of Grant of Patent Right for Invention in Chinese Patent Application No. 201910344752.2, mailed on Jun. 30, 2020, 3 pages (with English translation).
Notification of Grant of Patent Right for Invention in Chinese Patent Application No. 201910731061.8, mailed on Aug. 18, 2021, 3 pages (with English translation).
Office Action in Chinese Application No. 201980085840.3, mailed on Sep. 30, 2024, 27 pages (with English translation and English Search Report).
Office Action in Chinese Application No. 202110820876.0, mailed on Mar. 23, 2024, 23 pages (with English translation and English Search Report).
Office Action in Chinese Application No. 202110820876.0, mailed on Sep. 28, 2024, 26 pages (with English translation).
Office Action in Chinese Application No. 202110819268.8, mailed on Aug. 10, 2024, 13 pages (with English translation).
Office Action in Chinese Application No. 202110819268.8, mailed on Dec. 13, 2023, 10 pages (with English translation and English Search Report).
Office Action in Chinese Application No. 202110819268.8, mailed on Oct. 31, 2024, 10 pages (with English translation).
International Search Report and Written Opinion in International Appln. No. PCT/CN2019/103853, mailed on Feb. 1, 2020, 18 pages (with English translation).
Notice of Acceptance of Request for Reexamination in Chinese Appln. No. 202110819268.8, mailed on Dec. 25, 2024, 3 pages (with English translation).
Notice of Allowance in Chinese Appln. No. 202110820876.0, mailed on Dec. 8, 2024, 3 pages (with English translation).
Office Action in Chinese Appln. No. 201980085840.3, mailed on Feb. 14, 2025, 35 pages (with machine translation).
Li et al., "Research on dual-channel 3D imaging LiDAR technology," Surveying and Mapping Science, 2013, 38(3):183, pp. 49-51, 2 pages (English abstract only).

(56) References Cited

OTHER PUBLICATIONS

Notice of Allowance in Chinese Appln. No. 201980085840.3, mailed on Apr. 30, 2025, 11 pages (with machine translation).

* cited by examiner

LIDAR AND DETECTION APPARATUS THEREOF

CROSS-REFERENCE TO RELATED APPLICATIONS

This application is a continuation of copending International Patent Application No. PCT/CN2019/103853, filed on Aug. 30, 2019, which claims the benefit of Chinese Application No. 201910344752.2, filed on Apr. 26, 2019, and Chinese Application No. 201910731061.8, filed on Aug. 8, 2019. The disclosures of the related applications are incorporated by reference in their entireties.

FIELD

Embodiments of this application relate to the ranging field, and in particular, to a light detection and ranging (Lidar) system.

BACKGROUND

Lidar is a common name of active detection sensor devices by means of laser light. An operating principle of a Lidar system is substantially as follows: an emitter of the Lidar system emits a laser beam, and the laser beam returns to a laser receiver through diffuse reflection after encountering an object. A radar module may calculate a distance between the emitter and the object merely by multiplying a time interval between emission and receipt of the laser beam and the speed of light and then dividing the product by 2.

An existing Lidar system mainly adopts a structural design of a through shaft for a main shaft system structure. The through shaft refers to a main shaft structure extending from a top of the Lidar system to a bottom. However, the main shaft from the bottom to the top occupies a space inside the Lidar system, increasing difficulty in designing a ranging assembly or a radar rotor at an upper part of the Lidar system. Moreover, the through shaft costs relatively high in designing, has a complex mechanical structure, and is not tight in shaft system designing.

In addition, a current multi-line Lidar system has receiving channels and emitting channels in a one-to-one correspondence. For example, a 32-line radar requires 32 pairs of emitting light sources and receiving channels. Moreover, a rotatory scanning Lidar system develops toward a growing longitudinal (vertical) field of view and increasing scanning laser beams. However, the development trend requires increasing channels of the Lidar system. Increasing channels may increase costs of the Lidar system and causes shortage of an internal space, an increased volume, and increased difficulty of spatial arrangement of the emitter.

The existing Lidar system mainly adopts the structural design of the through shaft for the main shaft system structure. The main shaft extends from the top of the Lidar system to the bottom. In this case, during designing of a detection apparatus, an emitting mirror is required to deflect a light path to avoid the main shaft. The structural designing of the detection apparatus is relatively complex. Moreover, the multi-line Lidar system has receiving channels and emitting channels in a one-to-one correspondence, that is, each emitting light source has a photoelectric sensor element corresponding to the emitting light source. During use, each pair of emitting light source and photoelectric sensor element need to be manually adjusted in alignment to a light path, which may increase difficulty in using the Lidar system and reduce usage efficiency.

In addition, early Lidar systems, in general, are a single-line Lidar system. That is, there is typically only one laser and one detector in such early Lidar systems. This limits a target scanning range, which limits the detection of a target. In order to resolve the shortcomings of the single-line Lidar system, a multi-line Lidar system increasingly becomes a focus in research and commercial use. The existing multi-line Lidar system generally has high costs and consumes excessive energy.

SUMMARY

This application provides a Lidar system that can reduce a space occupied by a main shaft extending through the entire radar from top to bottom, and facilitate and simplify configuration of structures of devices on a radar rotor above the main shaft.

In order to resolve the above technical problems, an embodiment of this application discloses a Lidar system, including a main shaft, a radar rotor, an upper cartridge plate, a top cover, and a base.

The upper cartridge plate is fixedly disposed relative to the radar rotor and is closer to the base than to the top cover in an axial direction of the Lidar system.

The main shaft is disposed perpendicular to the base and is located between the upper cartridge plate and the base.

Optionally, the Lidar system further includes a rotatory support and a driving motor.

The rotatory support includes a first portion and a second portion, where the first portion is a hollow structure and is adapted to be sleeved on the main shaft, and the second portion is a disc surface structure perpendicular to the first portion, is adapted to be coupled to the radar rotor, and includes at least three rotatory sub-supports, where first ends of the rotatory sub-supports are coupled to the first portion, and second ends of the rotatory sub-supports are coupled to an edge of a disc surface of the second portion, and where the driving motor is adapted to drive, through the rotatory support, the radar rotor to rotate.

Optionally, a supporting protrusion is further disposed where the second end of each of the rotatory sub-supports is coupled to the edge of the disc surface, where the supporting protrusions protrude away from the base, and the radar rotor is adapted to be coupled to the rotatory support through the supporting protrusions.

Optionally, the Lidar system further includes a lower cartridge plate located between the upper cartridge plate and the base and disposed around the main shaft.

Optionally, the Lidar system further includes a wireless power supply assembly located between the upper cartridge plate and the lower cartridge plate.

The wireless power supply assembly includes a wireless transmitting coil, the wireless receiving coil, the transmitting circuit board, and the receiving circuit board.

The wireless transmitting coil, the wireless receiving coil, the transmitting circuit board, and the receiving circuit board are all disposed around the main shaft.

The wireless transmitting coil and the transmitting circuit board are fixedly disposed relative to the main shaft, and the wireless receiving coil and the receiving circuit board are fixedly disposed relative to the radar rotor.

The wireless transmitting coil is electrically connected to the transmitting circuit board, and the wireless receiving coil is electrically connected to the transmitting circuit board.

Optionally, the Lidar system further includes a driving motor including a magnet and an armature, where the magnet and the armature are both disposed around the main shaft, the magnet is farther from the main shaft than the armature, and the magnet is coupled to the transmitting circuit board.

Optionally, the Lidar system further includes a driving motor including a magnet and an armature, where the magnet and the armature are both disposed around the main shaft, the magnet is farther from the main shaft than the armature, and the transmitting circuit board is electrically connected to the armature to supply power to the armature.

Optionally, the driving motor is a direct current (DC) motor.

Optionally, the Lidar system further includes an angle measuring assembly disposed around the main shaft and farther from the main shaft than the wireless power supply assembly.

Optionally, the Lidar system further includes a cable interface configured to connect the Lidar system to an external device outside the Lidar system.

The embodiments of this application include, but are not limited to, the following effects:

(1) A non-through main shaft structure is adopted. Components such as the upper cartridge plate, the lower cartridge plate, the transmitting circuit board, and the receiving circuit board are compressed and superimposed at a lower position on the Lidar system to form a flat platform, which reduces a space occupied by a main shaft extending through the entire radar from top to bottom, and facilitates and simplifies configuration of structures such as a ranging assembly disposed above or below the main shaft.

(2) The supporting protrusion on the rotatory support improves rotation stability of the radar rotor above the main shaft and reduces influence of rotation on a life of the whole machine and quality of radar imaging.

(3) Since the hollow cartridge plate is sleeved on the main shaft, that is, the main shaft extends through the lower cartridge plate, the main shaft can provide better support for the rotatory support and improve the stability of the radar.

(4) In an existing Lidar system, a relatively complex disc motor is usually used to drive the radar rotor. However, in this application, a DC motor is used to drive the radar rotor. The DC motor has a simple structure and low costs, so that costs and complexity of the Lidar system can be reduced.

(5) Disposing an angle measuring assembly such as a coded disc at an outermost position close to a housing of the Lidar system can improve accuracy of angle measurement, thereby improving measurement accuracy of the Lidar system.

(6) The driving motor uses a magnet as a rotor and an armature as a stator. The magnet does not need to be supplied with power, and the armature is electrically connected to the transmitting circuit board and is supplied with power through the lower cartridge plate, reducing power supply pressure of the wireless power supply assembly.

This application is further intended to provide a Lidar system and a detection apparatus thereof. An emitting support and a receiving support in the Lidar system extend in directions parallel to each other, that is, the emitting support and the receiving support are substantially symmetrically disposed. In addition, positions of the elements on a light path are relatively fixed, and the structure is simple, so that the adjustment in alignment to the light path can be reduced or avoided.

In order to resolve the above technical problems, an aspect of this application discloses a detection apparatus of a Lidar system. The detection apparatus includes a lens tube, a light beam emitting device, an emitting lens assembly, a receiving lens assembly, and a photoelectric processing device.

The lens tube includes an emitting support and a receiving support, where the emitting support and the receiving support extend in directions parallel to each other.

The emitting lens assembly is located inside the emitting support and is located on a light path of a detection light beam emitted by the light beam emitting device. The receiving lens assembly is located inside the receiving support and is located on a light path of an echo light beam received by the photoelectric processing device.

It may be understood that the emitting support and the receiving support may be integrated, that is, the emitting support and the receiving support are two supports obtained by partitioning a lens tube by a light isolating plate, or may be two independent supports. A side wall of each of the supports is made of a light insulating material.

By disposing the emitting lens assembly and the receiving lens assembly in lens tubes extend in directions parallel to each other, an exiting direction of a detection light beam and an incident direction of an echo light beam are approximately parallel to each other without a need to deflect the light beam. Structures of the optical devices are relatively simple, and adjustment in alignment to a light path is reduced or avoided.

In another aspect of this application, the light beam emitting device includes an emitting circuit board located outside the emitting support and disposed at a rear end of the emitting support, where the rear end of the emitting support is one end of the emitting support opposite to the other end from which the detection light beam exits. The photoelectric processing device includes a receiving circuit board located outside the receiving support and disposed at a rear end of the receiving support, where the rear end of the receiving support is one end of the receiving support opposite to the other end that receives the echo light beam. An emitting magnetic isolating member is disposed at a rear end of the emitting circuit board and configured to shield from an electromagnetic signal generated by the emitting circuit board; and a receiving magnetic isolating member disposed at a rear end of the receiving circuit board and configured to shield from an electromagnetic signal transmitted by the receiving circuit board. The emitting magnetic isolating member and the receiving magnetic isolating member may be two separate parts, or may be integrated, which is not limited herein here. The emitting magnetic isolating member and the receiving magnetic isolating member can shield from electromagnetic crosstalk between the emitting circuit board and the receiving circuit board and reduce noise of circuits.

In another aspect of this application, the emitting support has an emitting hole on an end surface of a front end of the emitting support, and the detection light beam is adapted to be emitted from the emitting support through the emitting hole; the receiving support has a receiving hole on an end surface of a front end of the receiving support, and the echo light beam is adapted to be incident on the receiving support through the receiving hole; and the lens tube further includes an emitting light shielding plate and a receiving light shielding plate, where the emitting light shielding plate is located on an outer side of the end surface of the front end of the emitting support and is perpendicular to the end surface of the front end of the emitting support, and the receiving light shielding plate is located on an outer side of the end surface of the front end of the receiving support and is perpendicular to the end surface of the front end of the receiving support. The emitting light shielding plate and the receiving light shielding plate can respectively shield from the detection light beam emitted through the emitting hole and the echo light beam received through the receiving hole, trying to avoid mutual interference between the detection light beam emitted through the emitting hole and the echo light beam received through the receiving hole and reduce noise points in a point cloud map.

Another aspect of this application discloses a Lidar system, including a detection apparatus, a main shaft, an upper cartridge plate, a top cover, and a base.

The upper cartridge plate is fixedly disposed relative to the detection apparatus, is located below the supporting platform of the detection apparatus, and is closer to the base than to the top cover in an axial direction of the detection apparatus.

The main shaft is disposed perpendicular to the base and is located between the upper cartridge plate and the base.

The detection apparatus is rotatable about the main shaft by 360° to achieve scanning in a horizontal direction.

The Lidar system adopts a non-through main shaft structure. Components such as the upper cartridge plate, the lower cartridge plate, the transmitting circuit board, and the receiving circuit board are compressed and superimposed at a lower position on the Lidar system to form a flat platform, which reduces a space occupied by a main shaft extending through the entire Lidar system from top to bottom. Therefore, the detection apparatus disclosed in various aspects of this application can be installed on a flat platform to facilitate usage. This design facilitates independent maintenance and independent upgrade of the detection apparatus and the devices in the flat platform.

BRIEF DESCRIPTION OF THE DRAWINGS

The drawings forming a part of the present disclosure are used to provide further understanding of the present disclosure, and the exemplary embodiments and description of the present disclosure are used to explain the present disclosure but do not constitute an improper limitation on the present disclosure. In the drawings.

DETAILED DESCRIPTION

Figure 1:
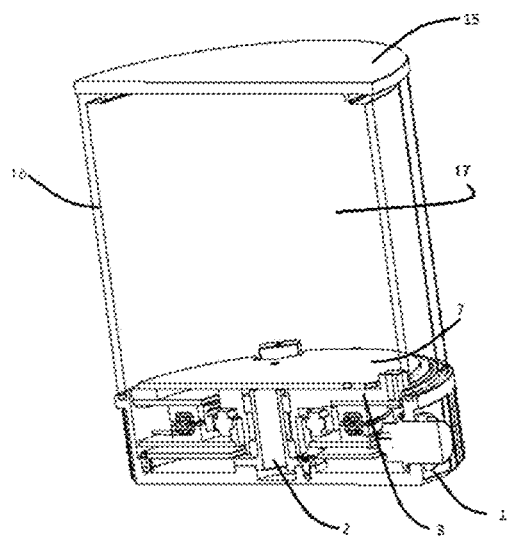
FIG. 1 is a schematic cross-sectional view of a Lidar system according to some embodiments of this application.

Exemplary embodiments are briefly described below. As those skilled in the art can realize, the described embodiments may be modified in various different ways without departing from the spirit or the scope of the present disclosure. Therefore, the drawings and the description are to be considered as illustrative in nature but not restrictive.

In the description of the present disclosure, it is understood that orientation or position relationships indicted by terms such as "center", "longitudinal", "transverse", "length", "width", "thickness", "upper", "lower", "front", "rear", "left", "right", "vertical", "horizontal", "top", "bottom", "interior", "exterior", "clockwise", and "counterclockwise" are based on orientation or position relationships shown in the drawings, are merely to facilitate the description of the present disclosure and simplify the description, instead of indicating or implying that the indicated apparatus or element needs to have particular orientations or be constructed and operated in particular orientations, and therefore cannot be construed as a limitation on the present disclosure. Furthermore, the terms "first" and "second" are merely used for descriptive purpose, and should not be interpreted as indicating or implying relative significance or implicitly indicating a number of the indicated technical features. Thus, features defined by "first" and "second" may explicitly or implicitly include one or more of the features. Unless otherwise explicitly and specifically defined, in the description of the present disclosure, "a plurality of" means two or more.

In the description of the present disclosure, it should be appreciated that, unless otherwise explicitly specified and defined, terms "install", "connect", and "connection" should be understood in a broadest sense, for example, a fixed connection, a detachable connection, an integral connection, a mechanical connection, an electrical connection, mutual communication, a direct connection, an indirect connection through an intermediate, or internal communication between two elements or an interaction relationship between two elements. The specific meanings of the above terms in the present disclosure may be understood according to specific circumstances for those ordinary skill in the art.

In the present disclosure, unless otherwise explicitly specified and defined, a first feature being "over" or "below" a second feature may mean that the first feature and the second feature are in direct contact, or the first feature and the second feature are not in direct contact but are in contact through another feature therebetween. Moreover, the first feature being "over", "above", and "on" the second feature includes that the first feature is directly above or obliquely above the second feature. The first feature being "under", "below", and "underneath" the second feature includes that the first feature is directly below or obliquely below the second feature.

The following disclosure provides many different embodiments or examples for achieving different structures of the present disclosure. In order to simplify the disclosure of the present disclosure, components and settings of specific examples are described below. Certainly, they are merely examples, and are not intended to limit the present disclosure. In addition, the present disclosure may repeat reference numerals and/or reference letters in different examples. The repetition is for the purpose of simplification and ease of discussion, but does not indicate a relationship between the various embodiments and/or settings discussed. In addition, the present disclosure provides examples of various specific processes and materials, but those of ordinary skill in the art may be aware of the application of other processes and/or use of other materials.

Exemplary embodiments of the present disclosure are described below with reference to the drawings. It should be understood that the exemplary embodiments described herein are merely used to illustrate and explain the present disclosure, and are not used to limit the present disclosure.

Illustrative embodiments of this application include, but are not limited to, a Lidar system.

In this application, terms commonly used by those skilled in the art are used to describe various aspects of the illustrative embodiments, so as to convey the essence of their work to other persons skilled in the art. However, those skilled in the art may practice some alternative embodiments by using a part of the described aspects. For the purpose of explanation, in order to provide thorough understanding of the illustrative embodiments, specific numbers, materials, and configurations are described. However, those skilled in the art may implement that alternative embodiments without specific details. In other cases, in order to avoid confusion between the illustrative embodiments, some well-known features are omitted or simplified.

In order to make the objectives, technical solutions, and advantages of this application clearer, the embodiments of this application are described in further detail below with reference to the drawings.

First Aspect

Figure 2:
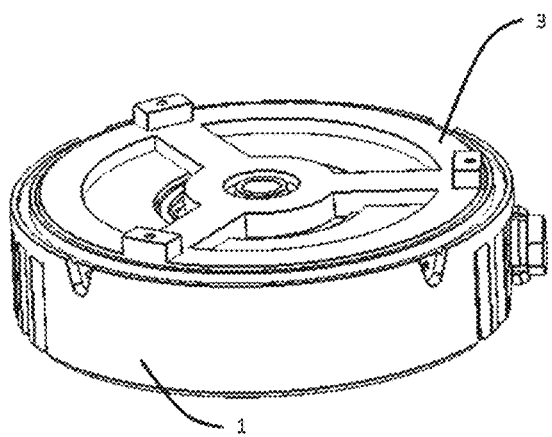
FIG. 2 is a schematic structural diagram of a flat platform of the Lidar system according to some embodiments of this application.
Figure 3:
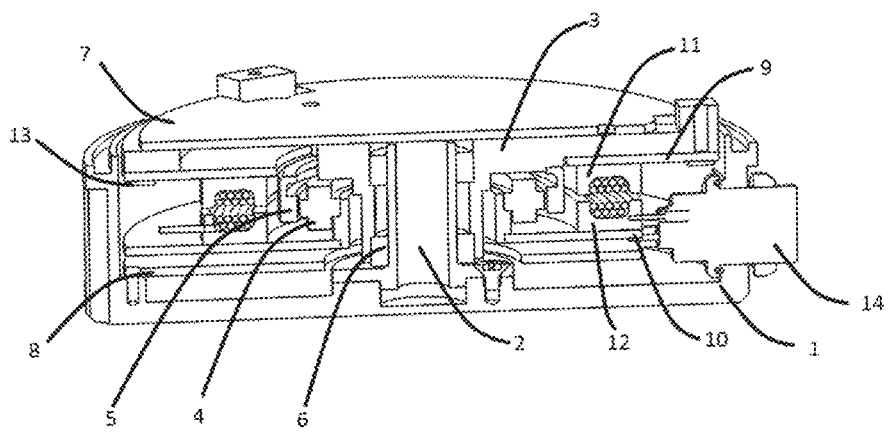
FIG. 3 is a schematic cross-sectional view of the flat platform of the Lidar system according to some embodiments of this application.

According to some embodiments of the first aspect of this application, a Lidar system is disclosed. FIG. 1 is a schematic cross-sectional structural view of a Lidar system. FIG. 2 and FIG. 3 are respectively a schematic structural diagram and a schematic cross-sectional view of a flat platform of the Lidar system according to some embodiments of this application. As shown in FIG. 1, a main shaft 2 of the Lidar system is located at a lower half of the entire radar but does not axially extend through the Lidar system, which reduces a space occupied by the main shaft extending through the entire radar from top to bottom, and facilitates and simplifies configuration of structures such as a ranging assembly above the main shaft.

Specifically, referring to FIG. 1, FIG. 2, and FIG. 3, the Lidar system may include a base 1, the main shaft 2, a housing 16, a radar rotor (a detection apparatus) 17, a rotatory support 3, a top cover 15, an upper cartridge plate 7, a lower cartridge plate 8, a bearing 6, a wireless power supply assembly, a DC motor, a communication assembly (not shown), a coded disc 13, and a cable interface 14. The main shaft 2 is located in a space formed by the upper cartridge plate 7 and the base 1 and is perpendicular to the base 1. It may be seen from exemplary structures of the rotatory support 3 and the main shaft 2 shown in FIG. 4 and FIG. 5 that a lower end portion 2B of the main shaft 2 is fixed to a main shaft base 1A after the main shaft penetrates the lower cartridge plate 8, as shown in FIGS. 3 and 3B, so that stability of the Lidar system can be improved. In addition, an upper end portion 2A of the main shaft 2 may be sleeved on a hollow first portion 3A of the rotatory support 3. In addition, it may be understood that, in other embodiments of the present disclosure, the main shaft 1 may not penetrate the lower cartridge plate 8 but is located over the lower cartridge plate 8, that is, the lower cartridge plate 8 is provided below a lower end of the main shaft base 1A.

Figure 4:
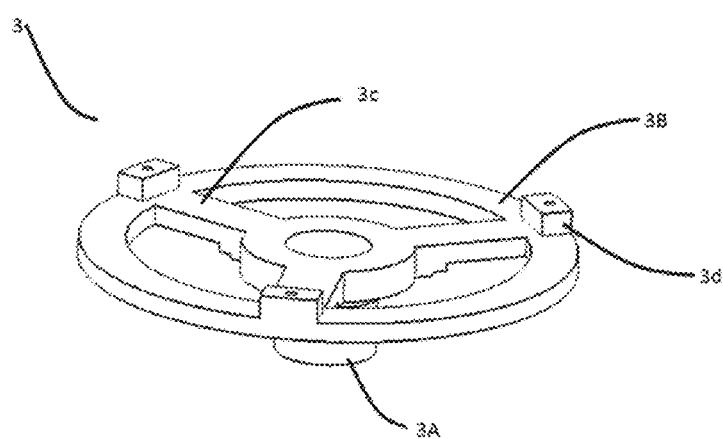
FIG. 4 is a schematic structural diagram of a rotatory support according to some embodiments of this application.
Figure 5:
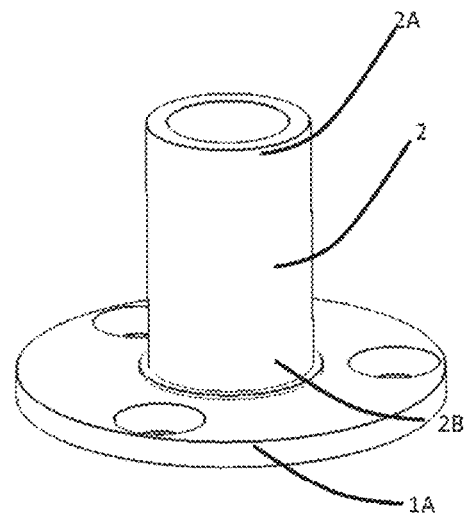
FIG. 5 is a schematic structural diagram of a main shaft according to some embodiments of this application.

As shown in FIG. 4, the first portion 3A of the rotatory support 3 is perpendicular to a second portion 3B of a disc surface structure, and the first portion 3A is sleeved on the main shaft 2, as shown in FIGS. 3 and 5. The second portion 3B is coupled to the radar rotor 17, as shown in FIG. 1. In an exemplary embodiment, the second portion 3B includes three rotatory sub-supports 3c. First ends of the rotatory sub-supports 3c are coupled to the first portion 3A, and second ends of the rotatory sub-supports 3c are coupled to an edge of a disc surface of the second portion 3B. A supporting protrusion 3d is further disposed where the second end of each of the rotatory sub-supports 3c is coupled to the edge of the disc surface, where the supporting protrusions 3d protrude away from the base 1 as shown in FIGS. 1-3, and the radar rotor 17 may be coupled to the rotatory support 3 through a through hole on the supporting protrusions 3d, thus improving rotation stability of the radar rotor 17 above the main shaft 2 and reducing influence of the rotation on a life of the whole machine and imaging quality of the radar. It may be understood that a number of rotatory sub-supports is not limited to three, and may also be any number greater than three, and a number of supporting protrusions may also be any number greater than three. In addition, the rotatory support may also adopt other structures adapted to be sleeved on the main shaft and bear the radar rotor, which is not limited herein.

The upper cartridge plate 7 is disposed on a part in an axial direction of the Lidar system closer to the base, and is located above the disc surface of the rotatory support 3, and the upper cartridge plate 7 is fixedly disposed relative to the radar rotor 17, that is, the upper cartridge plate 7 can rotate with the rotatory support 3, which is mainly configured to process various signals outputted from devices on the radar rotor 17 and transmitted to the devices on the radar rotor 17. It may be understood that the upper cartridge plate 7 may also have other functions, or may have other names. This application is not limited thereto. The lower cartridge plate 8 is mainly configured to process various signals received from the devices on the radar rotor 17 and to be transmitted to the devices on the radar rotor 17. It may be understood that the lower cartridge plate 8 may also have other functions, or may have other names. This application is not limited thereto. It should be appreciated that since a specific internal structure of the radar rotor 17 is irrelevant to implementation of the solutions to be embodied in this embodiment, the radar rotor 17 needs to be capable of rotating and completing distance detection. Therefore, the internal structure of the radar rotor 17 is not shown.

In an exemplary implementation, the communication assembly may include a first communication module and a second communication module. The first communication module is fixedly disposed relative to the radar rotor 17 and is electrically connected to the upper cartridge plate 7, and the second communication module is fixedly disposed relative to the main shaft 2 and is electrically connected to the lower cartridge plate 8.

In an embodiment of the present disclosure, the wireless power supply assembly may be located between the upper cartridge plate 7 and the lower cartridge plate 8, and may specifically include a wireless transmitting coil 12, a wireless receiving coil 11, a transmitting circuit board 10, and a receiving circuit board 9. The wireless transmitting coil 12, the wireless receiving coil 11, the transmitting circuit board 10, and the receiving circuit board 9 are all disposed around the main shaft 2. The wireless transmitting coil 12 and the transmitting circuit board 10 are fixedly disposed relative to the main shaft 2, the wireless receiving coil 11 and the receiving circuit board 9 are fixedly disposed relative to the radar rotor 17, and the wireless transmitting coil 12 and the wireless receiving coil 11 move relative to each other and are configured to supply power to a driving motor and the devices on the radar rotor 17 such as a ranging assembly fixedly disposed, in the radar rotor 17, relative to the radar rotor 17.

The driving motor is disposed around the main shaft 2 and drives the radar rotor 17 sleeved on the rotatory support 3 to rotate relative to the main shaft 2 or the base 1 by driving the rotatory support 3 to rotate. The driving motor herein may be a DC motor. The DC motor includes a magnet 5 and an armature 4. The magnet 5 and the armature 4 both disposed around the main shaft 2 may respectively serve as a stator and a rotor, or vice versa. For example, the magnet 5 may be configured as a rotor, and the armature 4 may be configured as a stator. The magnet 5 is sleeved on an outer side of the armature 4 and is farther from the main shaft 2. Since the magnet 5 does not need to be supplied with power, and the lower cartridge plate 8 is electrically connected to the armature 4 through a wired connection form to supply power to the armature 4, power supply pressure of the wireless power supply assembly can be reduced. It may be understood that, in other embodiments of the present disclosure, the magnet 5 and the armature 4 of the DC motor may also be configured as other functional roles. For example, the magnet 5 serves as a stator of the motor to be coupled to the transmitting circuit board 10, and the armature 4 serves as a rotor of the motor and may be supplied with power by the wireless power supply assembly. In addition, the driving motor in this application may also be other types of driving motors, and is not limited to a DC motor. An existing Lidar system usually adopts a disc motor, which has a complex structure. However, the Lidar system of this application adopts a DC motor. The DC motor has a simple structure and low costs, so that complexity of the Lidar system can be reduced.

During exemplary implementation, the coded disc 13 may serve as an angle measuring assembly. The coded disc 13 is disposed around the main shaft 2 and is farther from the main shaft 2 than the wireless power supply assembly, that is, the coded disc 13 is disposed at a position farthest from the main shaft 2 in a circumferential direction, close to a peripheral wall of the housing of the base 1. By disposing the coded disc 13 on the outermost side, namely, close to the housing 16, accuracy of angle measurement of the coded disc can be improved.

Figure 3A:
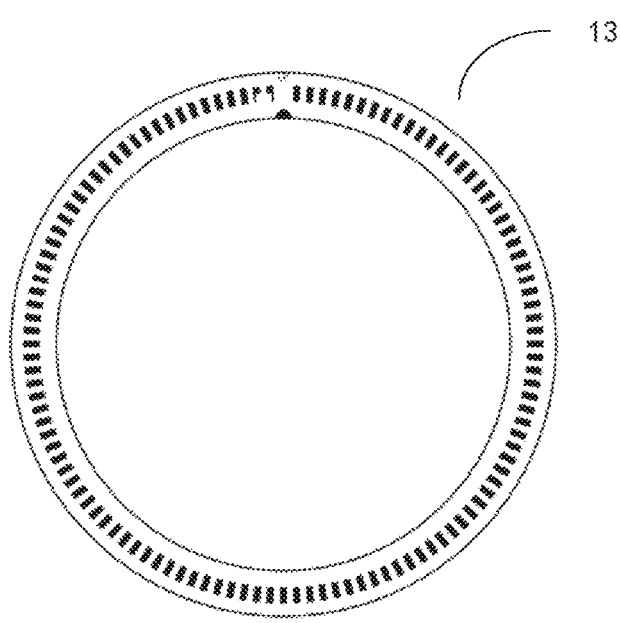
FIG. 3A is a schematic diagram of a coded disc according to some embodiments of this application.
Figure 3B:
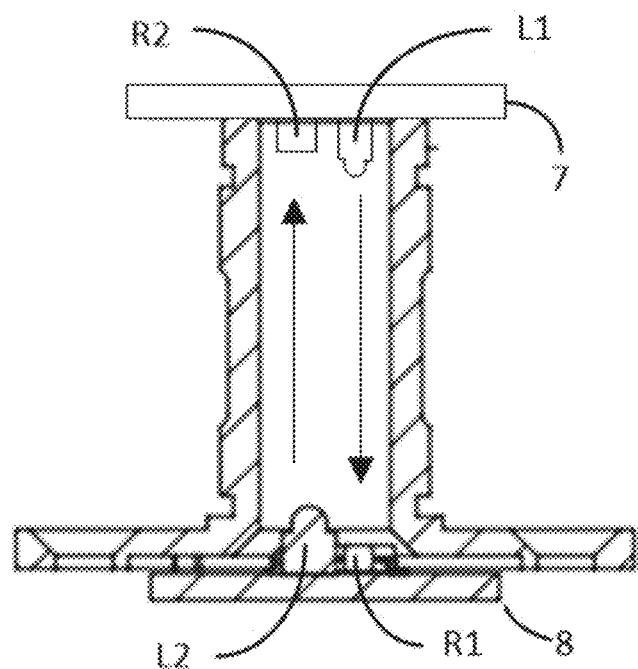
FIG. 3B is a schematic diagram of uplink communication and downlink communication.

FIG. 3A shows the coded disc 13 according to an embodiment of the present disclosure. As shown in FIGS. 3 and 3A, the coded disc 13 is roughly ring-shaped and may be disposed around the main shaft 2. The coded disc 13 has, for example, a plurality of gaps or coded marks regularly distributed for photoelectric elements to perform measurement. The coded disc 13 may rotate synchronously with, for example, the upper cartridge plate 7 and the radar rotor 17, as shown in FIG. 1. During the rotation, an optoelectronic component (not shown) may identify or determine a rotation angle of the radar rotor 17 through the gaps or the coded marks on the coded disc 13, to orientate an angle of the radar rotor 17, thus determining a horizontal scanning angle of the Lidar system.

In addition, the cable interface 14 is configured to connect the Lidar system to other electronic devices, such as other Lidar systems or electronic devices, so that a signal inside the current Lidar system can be transmitted to outside of the current Lidar system. The cable interface 14 may be waterproof, which can prevent influence on signal transmission when water enters the Lidar system, thereby improving a waterproof capability of the radar. An operation process of the Lidar system is as follows:

The second communication module transmits, to the first communication module in a form of, for example, an optical signal, ranging instruction information transmitted by the lower cartridge plate 8, which is the so-called uplink optical signal transmission or uplink communication. The first communication module transmits, through the upper cartridge plate 7, the ranging instruction information to the ranging assembly disposed inside the radar rotor 17. The ranging assembly starts a ranging task after receiving the ranging instruction information.

Ranging result information generated by the ranging assembly by performing the ranging task is processed by the upper cartridge plate 7 and then transmitted to the second communication module through the first communication module, for example, in the form of an optical signal, which is the so-called downlink optical signal transmission or downlink communication: after receiving the ranging result information through a control assembly of the second communication module, the lower cartridge plate performs relevant analysis and processing on the ranging result information.

According to an exemplary embodiment of the present disclosure, in order to avoid crosstalk between the uplink communication and the downlink communication, different wavelengths are used for the uplink communication and the downlink communication. Compared with the uplink communication, the downlink communication has more to-be-transmitted data and a larger transmission speed. According to an example, a laser at about 904 nm may be used as an optical communication emitting unit for the downlink communication, and a red light-emitting diode (LED) may be used as an optical communication emitting unit for the uplink communication. FIG. 3B is a schematic diagram of uplink communication and downlink communication. A downward arrow represents the downlink communication, and an upward arrow represents the uplink communication. As shown in FIG. 3B, for the downlink communication, a first optical communication emitting unit L1, such as a laser with a wavelength of about 904 nm is provided on the upper cartridge plate 7, and a first optical communication receiving unit R1 is provided on the lower cartridge plate 8, which can receive or process an optical signal with a wavelength corresponding to that of the first optical communication emitting unit L1. For the uplink communication, a second optical communication emitting unit L2, such as a red LED is provided on the lower cartridge plate 8, and a second optical communication receiving unit R2 is provided on the upper cartridge plate 7, which can receive or process an optical signal with a wavelength corresponding to that of the second optical communication emitting unit L2. Therefore, the first communication module includes the first optical communication emitting unit L1 and the second optical communication receiving unit R2, and the second communication module includes the second optical communication emitting unit L2 and the first optical communication receiving unit R1. In addition, as shown in FIG. 3B, according to an exemplary embodiment of the present disclosure, the first communication module and the second communication module are both disposed inside the main shaft 2 to save space.

Since light emitted by the optical communication emitting units of the modules for the uplink communication and the downlink communication have relatively large angles of divergence, there will be basic emission and receipt in a one-to-one manner, that is, the first communication module and the second communication module each may include one optical communication emitting unit and one optical communication receiving unit. In this way, structures of the communication components are relatively simple. Using different wavelengths for the uplink communication and the downlink communication respectively can also reduce interference and improve communication efficiency. In addition, the modules for the uplink communication and the downlink communication are both disposed at an axis position. Specifically, the first communication module and the second communication module are both disposed relatively close to a center of a circumferential cross section of the main shaft 2 regardless of being on the upper cartridge plate or the lower cartridge plate. The communication devices are not large, so that the center of the circumferential cross section is sufficient to accommodate the communication devices. In this way, space can be effectively used.

In addition, during the operation of the Lidar system, the wireless transmitting coil 12 and the wireless receiving coil 11 rotate relative to each other, and the wireless power supply assembly can supply power to the ranging assembly disposed in the radar rotor 17, so that the ranging assembly performs the ranging task. In addition, the coded disc 13 for angle measurement measures the rotation angle of the radar (that is, the horizontal scanning angle of the radar) during the operation of the Lidar system. Further technical solutions of this application are summarized in the following embodiments.

Embodiment 1: a Lidar system, including a main shaft, a radar rotor, an upper cartridge plate, a top cover, and a base. The upper cartridge plate is fixedly disposed relative to the radar rotor and is closer to the base than to the top cover in an axial direction of the Lidar system.

The main shaft is disposed perpendicular to the base and is located between the upper cartridge plate and the base.

Embodiment 2: the Lidar system according to Embodiment 1, further including a rotatory support and a driving motor. The rotatory support includes a first portion and a second portion, where the first portion is a hollow structure and is adapted to be sleeved on the main shaft, and the second portion is a disc surface structure perpendicular to the first portion, is adapted to be coupled to the radar rotor, and includes at least three rotatory sub-supports, where first ends of the rotatory sub-supports are coupled to the first portion, and second ends of the rotatory sub-supports are coupled to an edge of a disc surface of the second portion, and where the driving motor is adapted to drive, through the rotatory support, the radar rotor to rotate.

Embodiment 3: the Lidar system according to Embodiment 2, where a supporting protrusion is further disposed where the second end of each of the rotatory sub-supports is coupled to the edge of the disc surface, where the supporting protrusions protrude away from the base, and the radar rotor is adapted to be coupled to the rotatory support through the supporting protrusions.

Embodiment 4: the Lidar system according to Embodiment 1 or 2, further including a lower cartridge plate located between the upper cartridge plate and the base and disposed around the main shaft.

Embodiment 5: the Lidar system according to Embodiment 4, further including a wireless power supply assembly located between the upper cartridge plate and the lower cartridge plate, where the wireless power supply assembly includes a wireless transmitting coil, a wireless receiving coil, a transmitting circuit board, and a receiving circuit board.

The wireless transmitting coil, the wireless receiving coil, the transmitting circuit board, and the receiving circuit board are all disposed around the main shaft.

The wireless transmitting coil and the transmitting circuit board are fixedly disposed relative to the main shaft, and the wireless receiving coil and the receiving circuit board are fixedly disposed relative to the radar rotor.

The wireless transmitting coil is electrically connected to the transmitting circuit board, and the wireless receiving coil is electrically connected to the receiving circuit board.

Embodiment 6: the Lidar system according to any of Embodiments 2 to 5, further including a driving motor including a magnet and an armature, where the magnet and the armature are both disposed around the main shaft, the magnet is farther from the main shaft than the armature, and the magnet is coupled to the transmitting circuit board.

Embodiment 7: the Lidar system according to any of Embodiments 2 to 5, further including a driving motor including a magnet and an armature, where the magnet and the armature are both disposed around the main shaft, the magnet is farther from the main shaft than the armature, and the transmitting circuit board is electrically connected to the armature to supply power to the armature.

Embodiment 8: the Lidar system according to any of Embodiments 2 to 7, where the driving motor is a DC motor.

Embodiment 9: the Lidar system according to any of Embodiments 5 to 8, further including an angle measuring assembly disposed around the main shaft and farther from the main shaft than the wireless power supply assembly.

Embodiment 10: the Lidar system according to any of Embodiments 1 to 9, further including a cable interface configured to connect the Lidar system to an external device outside the Lidar system.

Second Aspect

Illustrative embodiments of the second aspect of this application include, but are not limited to, a detection apparatus of a Lidar system and a Lidar system.

Figure 6:
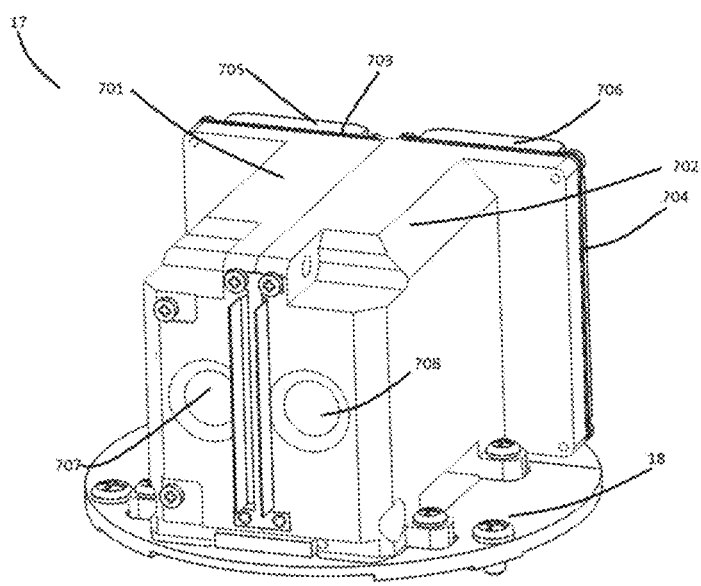
FIG. 6 is a schematic structural diagram of a detection apparatus of the Lidar system according to some embodiments of this application.
Figure 7:
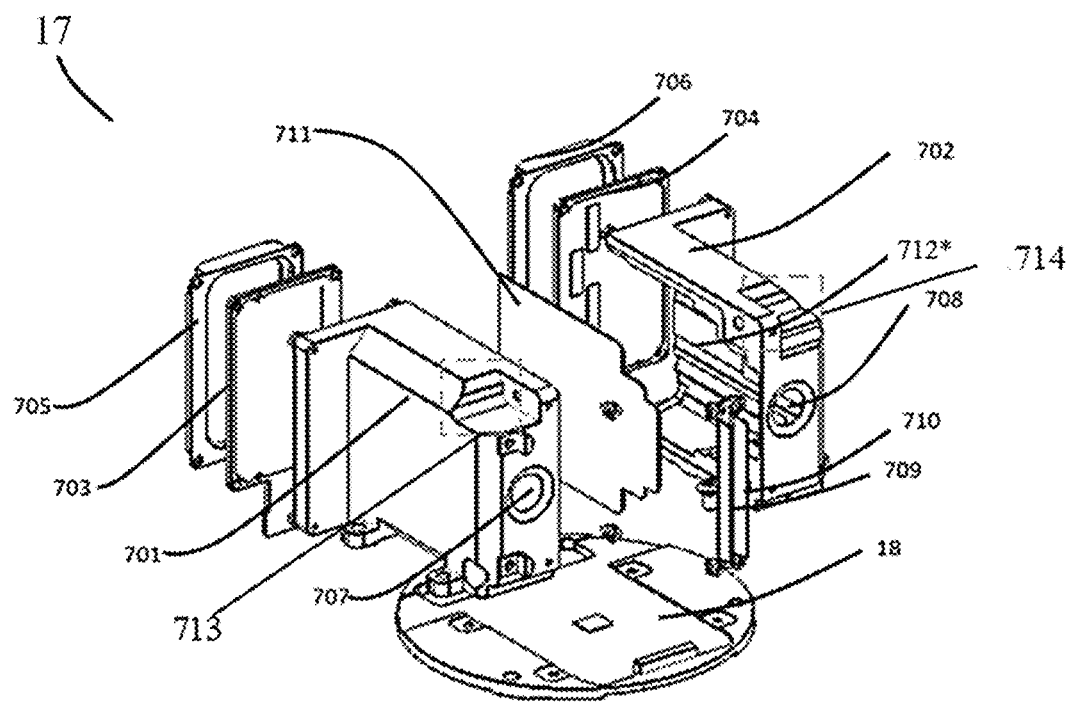
FIG. 7 is an exploded view of the detection apparatus according to some embodiments of this application.
Figure 9:
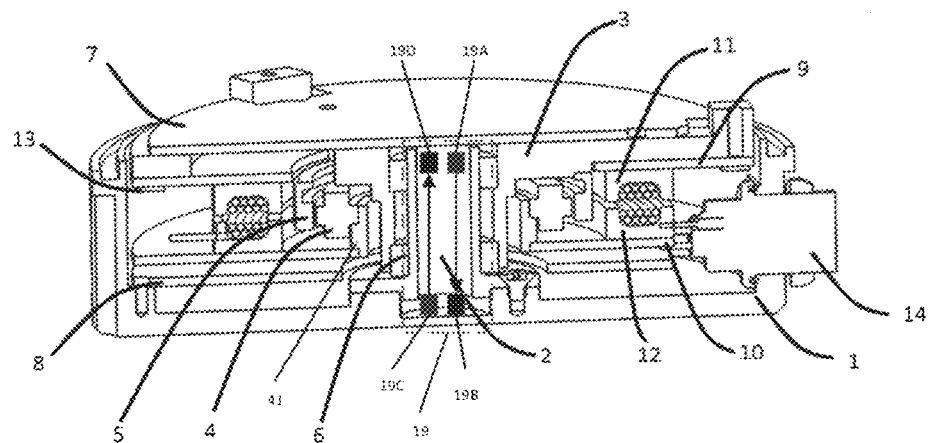
FIG. 9 is a schematic cross-sectional view of the flat platform of the Lidar system according to some embodiments of this application.
Figure 10:
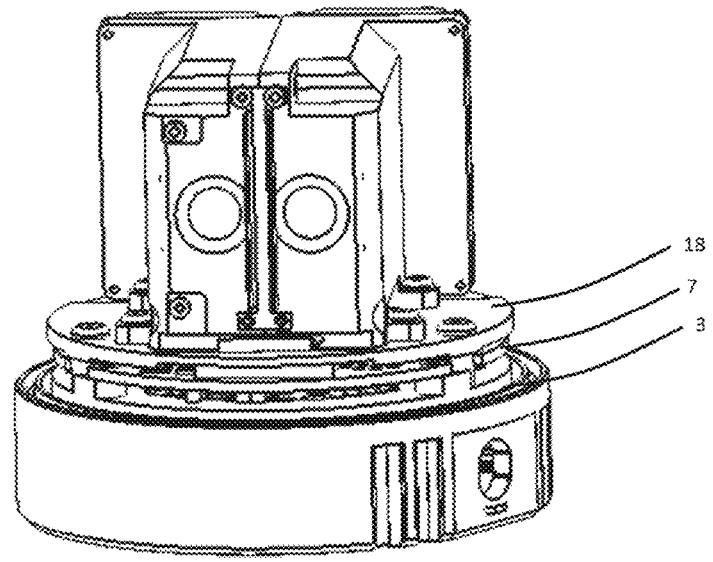
FIG. 10 is a schematic cross-sectional view of the Lidar system according to some embodiments of this application.

According to some embodiments of this application, a Lidar system is disclosed. FIG. 1 shows a cross-sectional structure of the Lidar system. FIG. 6 and FIG. 7 are respectively a schematic structural diagram and an exploded view of the detection apparatus of the Lidar system. FIG. 2 is a schematic structural diagram of a flat platform of the Lidar system. FIG. 9 is a schematic cross-sectional view of the flat platform of the Lidar system. As shown in FIG. 1, a main shaft 2 of the Lidar system is located at a lower half of the entire radar but does not axially extend through the Lidar system, which reduces a space occupied by the main shaft extending through the entire radar from top to bottom, and facilitates and simplifies configuration of structures such as the detection apparatus above the main shaft.

Specifically, referring to FIG. 1, FIG. 6, FIG. 7, FIG. 2, FIG. 9, and FIG. 10, the Lidar system may include a base 1, the main shaft 2, a rotatory support 3, a supporting platform 18, a detection apparatus (a radar rotor) 17, a top cover 15, a housing 16, an upper cartridge plate 7, a lower cartridge plate 8, a bearing 6, wireless power supply assemblies (11 and 12), a DC motor, a communication assembly 19, a coded disc 13, and a cable interface 14.

The main shaft 2 extends between the upper cartridge plate 7 and the base 1 and is perpendicular to the base 1. The main shaft 2 has a hollow structure, and the communication assembly 19 is disposed in the main shaft 2. The detection apparatus 17 is located in a space formed by the upper cartridge plate 7, the top cover 15, and the housing 16. In an embodiment of the present disclosure, driven by the DC motor, the upper cartridge plate 7, the detection apparatus 17, and the housing 16 can rotate by 360 degrees about the main shaft 2 together to achieve horizontal scanning of the Lidar system.

In another embodiment of the present disclosure, driven by the DC motor, the upper cartridge plate 7 and the detection apparatus 17 can also rotate inside the housing 16 to achieve the horizontal scanning of the Lidar system. It may be understood that, in this application, a horizontal direction is a direction perpendicular to the main shaft 2.

As shown in FIG. 6 and FIG. 7, the detection apparatus 17 includes: the supporting platform 18 located above the upper cartridge plate 7, a lens tube located above the supporting platform 18 and are fixedly disposed relative to the supporting platform 18, a light beam emitting device 703, an emitting lens assembly, a receiving lens assembly, a photoelectric processing device 704, a light isolating plate 711, an emitting magnetic isolating member 705, and a receiving magnetic isolating member 706. The lens tube includes an emitting support 701 and a receiving support 702 separated by the light isolating plate 711. The emitting support 701 and the receiving support 702 extend in directions parallel to each other, and the emitting support 701 and the receiving support 702 are symmetrically disposed relative to the light isolating plate 711.

During exemplary implementation, the emitting support 701 and the receiving support 702 may also be an integrated structure, provided that they can be used to install and fix the emitting lens assembly and the receiving lens assembly. It may be understood that the top cover 15 and the housing 16 may be disposed separately or integrally. In addition, in order to facilitate exit of an emitted light beam and receipt of an echo light beam, at least a part of the housing 16 is transparent.

Figure 7A:
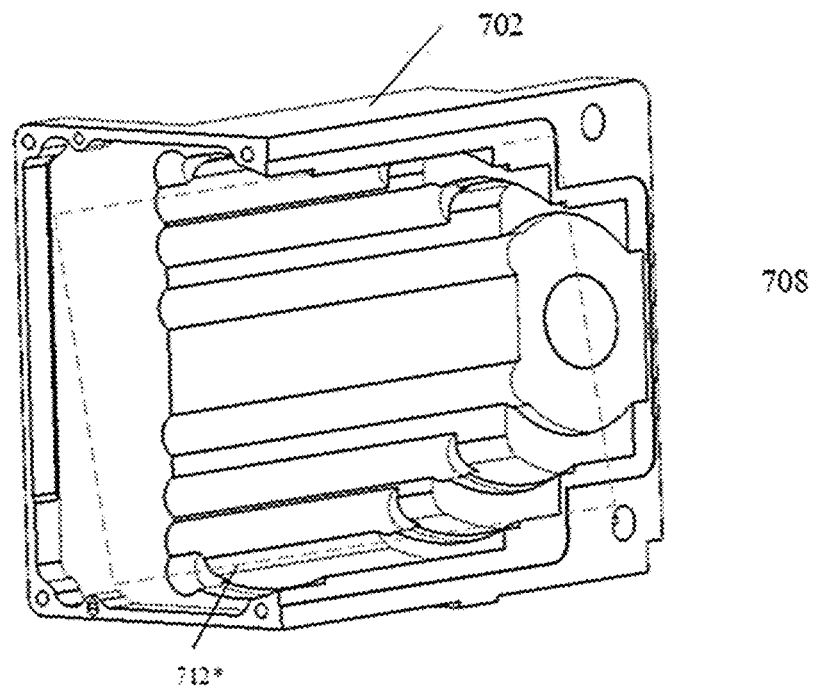
FIG. 7A is a cross-sectional view of an emitting support according to some embodiments of this application.
Figure 7B:
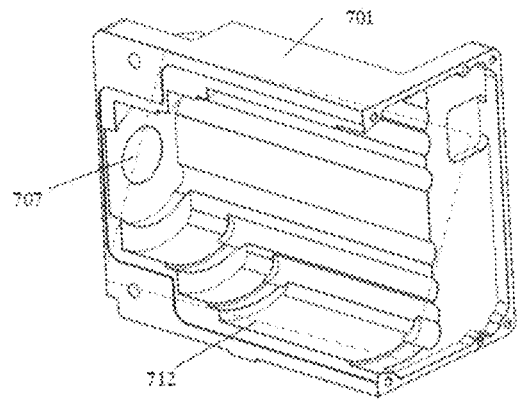
FIG. 7B is a cross-sectional view of a receiving support according to some embodiments of this application.
Figure 8:
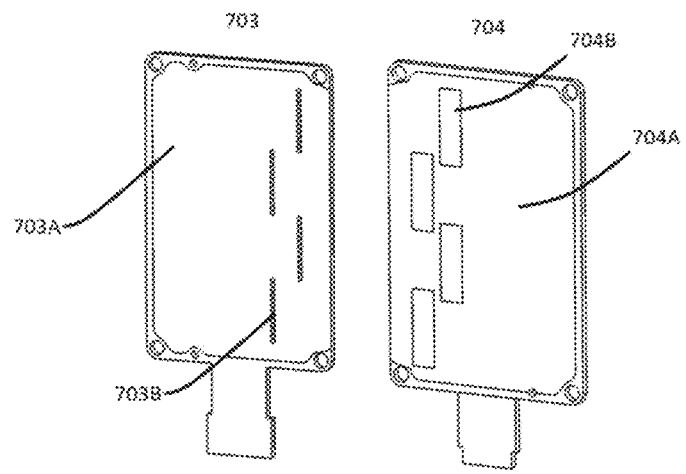
FIG. 8 is a schematic diagram of a light beam emitting device and a photoelectric processing device according to some embodiments of this application.

During exemplary implementation, referring to FIG. 7 and FIG. 7B, the emitting support 701 has an emitting hole 707 and an emitting light shielding plate 709 on an end surface of a front end of the emitting support, and a stepped structure 713 is disposed on a top of the emitting support 701. The stepped structure 713 may be used to reduce a weight of the emitting support 701. Moreover, the emitting support 701 has a groove 712 on an inner wall thereof. The groove 712 is configured to install the emitting lens assembly. In detail, the emitting lens assembly may include optical devices such as a collimator and a converging lens. With reference to FIG. 8, a light beam emitting device 703 is disposed outside a rear end of the emitting support 701, and the light beam emitting device 703 includes an emitting circuit board 703A and m×n emitting light sources 703B. The m×n emitting light sources 703B are alternately disposed on the emitting circuit board 703A in a vertical direction. As shown in FIG. 8, for example, there are 4×16 emitting light sources 703B, and every 16 emitting light sources 703B are vertically arranged in a row. At least one of m and n is a natural number greater than 1. During use, detection light beams emitted by the plurality of light emitting light sources 703B pass through the emitting lens group and exit through the emitting hole 707 to a to-be-measured space. The emitting light shielding plate 709 is perpendicular to an end surface of a front end of the emitting support 701. The emitting light shielding plate and the emitting hole 707 are located on the same side of the light isolating plate 711. The emitting light shielding plate can prevent the detection light beams from entering the receiving hole 708 after exiting from the emitting hole 707 and reflected by the housing 16, thereby avoiding interference to echo light beams received through the receiving hole 708 and reducing noise points in a scanned point cloud map.

Similarly, referring to FIG. 7 and FIG. 7A, the receiving support 702 has a receiving hole 708 and a receiving light shielding plate 710 on an end surface of a front end of the receiving support, and a stepped structure 714 is disposed on a top of the receiving support 702. The stepped structure 714 may be used to reduce a weight of the receiving support 702. Moreover, the receiving support 702 has a groove 712\* on an inner wall thereof. The groove 712\* is configured to install the receiving lens assembly. In detail, the receiving lens assembly may include optical devices such as a converging lens. A photoelectric processing device 704 is disposed outside a rear end of the receiving support 702, and the photoelectric processing device 704 includes a receiving circuit board 704A and a plurality of photoelectric sensor elements 704B. i×j photoelectric sensor elements 704B are disposed on the receiving circuit board 704A. At least one of i and j is a natural number greater than 1. For example, the receiving circuit board shown in FIG. 8 has m×n photoelectric sensor elements 704B corresponding to the m×n emitting light sources 703B. In this case, i=m and j=n. In addition, it may be understood that, in other embodiments, the photoelectric sensor elements 704B and the emitting light sources 703B may not have a one-to-one correspondence, for example, may have a one-to-many relationship or a many-to-one relationship.

During use, the echo light beams are incident on the receiving support 702 through the receiving hole 708, and then incident on the photoelectric sensor element 704B on the receiving circuit board 704A after being converged by the receiving lens assembly. The receiving light shielding plate 710 is located on an end surface of a front end of the receiving support 702 and is perpendicular to the end surface, and the receiving light shielding plate 710 is located on the same side of the light isolating plate 711 as the receiving hole 708, which can prevent the detection light beams exiting through the emitting hole 707 from entering the receiving hole 708 as a result of being reflected by the housing 16, thereby avoiding interference to the echo light beams received through the receiving hole 708, and reducing noise points in a scanned point cloud map.

It may be understood that, in this embodiment of this application, the optical devices in the receiving lens assembly and the emitting lens assembly are fixedly positioned inside the receiving support 702 and the emitting support 701, and the receiving circuit board 704A and the emitting circuit board 703A can be accurately positioned (that is, at the rear ends of the receiving support 702 and the emitting support 701), which can reduce adjustment of the whole machine to a specific extent.

It may be understood that, in this embodiment of this application, the photoelectric sensor elements 704B and the emitting light sources 703B may be disposed in a one-to-one manner, or may have different numbers, which is not limited herein. In addition, in order to facilitate alignment between the photoelectric sensor element 704B and the emitting light source 703B, one of the photoelectric sensor element 704B and the emitting light source 703B may be fixedly disposed, and the other is set to be adjustable. In addition, the plurality of emitting light sources 703B can emit light beams sequentially or simultaneously during operation.

As described above, the emitting circuit board 703A and the receiving circuit board 704A can be accurately positioned at the rear ends of the emitting support 701 and the receiving support 702 respectively, so that the adjustment of the whole machine can be reduced.

The emitting magnetic isolating member 705 is disposed on a side surface of the emitting circuit board 703A which is opposite to the rear end of the emitting support body 701, and the emitting magnetic isolating member 705 is configured to shield from an electromagnetic signal generated by the emitting circuit board 703A. The receiving magnetic isolating member 706 is disposed on a side surface of the receiving circuit board 704A which is opposite to the rear end of the receiving support 702, and is configured to shield from an electromagnetic signal generated by the receiving circuit board 704A.

The flat platform of this application is described below with reference to FIG. 2, FIG. 4, FIG. 5, and FIG. 9. As shown in the figures, a lower end portion 2B of the main shaft 2 is fixed to a main shaft base 1A after the main shaft penetrates the lower cartridge plate 8, so that stability of the Lidar system can be improved. In addition, an upper end portion 2A of the main shaft 2 may be sleeved on a hollow first portion 3A of the rotatory support 3. In addition, it may be understood that, in other embodiments of the present disclosure, the main shaft 2 may not penetrate the lower cartridge plate 8 but is located over the lower cartridge plate 8, that is, the lower cartridge plate 8 is provided below a lower end of the main shaft base 1A.

As shown in FIG. 4, the first portion 3A of the rotatory support is perpendicular to a second portion 3B of a disc surface structure, and the first portion 3A is sleeved on the main shaft 2. The second portion 3B is coupled to the housing 16. In an exemplary embodiment, the second portion 3B includes three rotatory sub-supports 3c. First ends of the rotatory sub-supports 3c are coupled to the first portion 3A, and second ends of the rotatory sub-supports 3c are coupled to an edge of a disc surface of the second portion 3B. A supporting protrusion 3d is further disposed where the second end of each of the rotatory sub-supports 3c is coupled to the edge of the disc surface, where the supporting protrusions 3d protrude away from the base 1, and the upper cartridge plate 7 may be coupled to the rotatory support 3 through a through hole on the supporting protrusions 3d, thus improving rotation stability of the detection apparatus 17 and reducing influence of the rotation on a life of the whole machine and imaging quality of the radar. It may be understood that a number of rotatory sub-supports is not limited to three, and may also be any number greater than three, and a number of supporting protrusions may also be any number greater than three. In addition, the rotatory support may also adopt other structures adapted to be sleeved on the main shaft and bear the upper cartridge plate 7, which is not limited herein.

The upper cartridge plate 7 is disposed on a part in an axial direction of the Lidar system closer to the base, and is located above the disc surface of the rotatory support 3, and the upper cartridge plate 7 is fixedly disposed relative to the rotatory support 3, that is, the upper cartridge plate 7 can rotate with the rotatory support 3, which is mainly configured to process various signals outputted from devices on the detection apparatus 17 and transmitted to the devices on the detection apparatus 17. It may be understood that the upper cartridge plate 7 may also have other functions, or may have other names. This application is not limited thereto. The lower cartridge plate 8 is mainly configured to process various signals received from the devices on the detection apparatus 17 and to be transmitted to the devices on the detection apparatus 17. It may be understood that the lower cartridge plate 8 may also have other functions, or may have other names. This application is not limited thereto.

Figure 11:
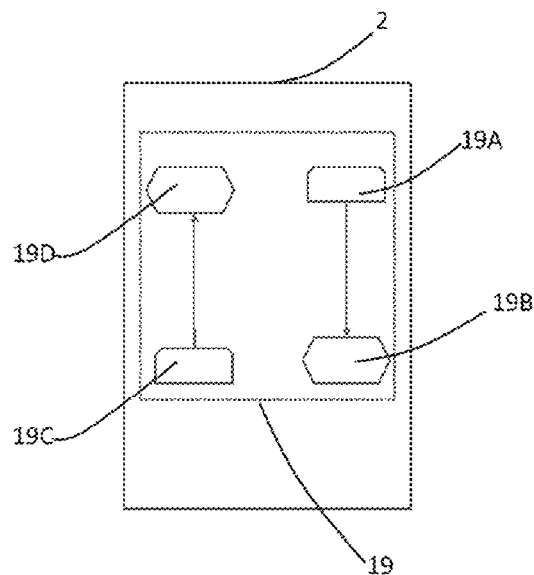
FIG. 11 is a schematic structural diagram of a communication assembly in the main shaft according to some embodiments of this application.

In an exemplary implementation, as shown in FIG. 11, the communication assembly 19 may include a light emitting element 19A and a photoelectric sensor element 19D that form the first communication module and a light emitting element 19C and a photoelectric sensor element 19B that form the second communication module. The light emitting element 19A and the photoelectric sensor element 19D of the first communication module are fixedly disposed relative to the rotatory support 3 and are electrically connected to the upper cartridge plate 7, and the light emitting element 19C and the photoelectric sensor element 19B of the second communication module are fixedly disposed relative to the main shaft 2 and are electrically connected to the lower cartridge plate 8. A wavelength of a light beam emitted by the light emitting element 19A is different from a wavelength of a light beam emitted by the light emitting element 19C. Specifically, the light emitting element 19C emits a light beam having a wavelength of $\lambda 1$, and the light emitting element 19C may perform uplink communication with the photoelectric sensor element 19D by using the light beam having the wavelength of $\lambda 1$, that is, transmit some instruction information of the lower cartridge plate 8 to the upper cartridge plate 7. The light emitting element 19A emits a light beam having a wavelength of $\lambda 2$, and the light emitting element 19A may perform downlink communication with the photoelectric sensor element 19B by using the light beam having the wavelength of $\lambda 2$, that is, transmit, through the upper cartridge plate 7, some information detected by the detection apparatus 17 to the lower cartridge plate 8. Since the main shaft 2 is disposed below the detection apparatus in the Lidar system, a relatively large number of devices are disposed in the flat platform, and the communication assembly 19 is disposed in the hollow main shaft 2, which can effectively save a space in the flat platform and facilitate placement of other devices in the platform.

It may be understood that, in actual application, communication assemblies of numbers different from those of the light emitting elements and the photoelectric sensor elements in FIG. 11 may be disposed, which is not limited herein. For example, considering that an amount of downlink data transmission is larger than an amount of uplink data transmission, more light emitting elements may be disposed in the second communication module than in the first communication module. It may be understood that the light emitting element may be any device capable of emitting light, including but not limited to a laser diode, a light emitting diode, an organic light emitting diode, and a laser beam emitter. The photoelectric sensor element is any sensor capable of mutual conversion of photoelectric information, including but not limited to a phototube, a photomultiplier, a photoresistor, a photosensitive diode, a photosensitive triode, a photocell, and an avalanche diode, and the like.

In an embodiment of the present disclosure, the wireless power supply assembly may be located between the upper cartridge plate 7 and the lower cartridge plate 8, and may specifically include a wireless transmitting coil 12, a wireless receiving coil 11, a transmitting circuit board 10, and a receiving circuit board 9. The wireless transmitting coil 12, the wireless receiving coil 11, the transmitting circuit board 10, and the receiving circuit board 9 are all disposed around the main shaft 2. The wireless transmitting coil 12 and the transmitting circuit board 10 are fixedly disposed relative to the main shaft 2, the wireless receiving coil 11 and the receiving circuit board 9 are fixedly disposed relative to the rotatory support 3, and the wireless transmitting coil 12 and the wireless receiving coil 11 move relative to each other and are configured to supply power to a driving motor and the detection apparatus 17.

The driving motor is disposed around the main shaft 2 and drives the housing 16, the detection apparatus 17, and the upper cartridge plate 7 sleeved on the rotatory support 3 to rotate relative to the main shaft 2 or the base 1 by driving the rotatory support 3 to rotate. The driving motor herein may be a DC motor. The DC motor includes a magnet 5 and an armature 4 both disposed around the main shaft 2. Referring to FIG. 9, the magnet 5 is disposed around the main shaft 2 and is fixedly connected to the rotatory support 3. The armature 4 is also disposed around the main shaft 2. The armature 4 is formed by winding a coil on a silicon steel sheet. Therefore, a cross section of the armature 4 is similar to a cross shape, and a specific gap is present between the armature 4 and the magnet 5. In addition, an armature fixing ring 41 is disposed around the main shaft 2 and is connected to the armature 4 and the transmitting circuit board 10 to fix the armature 4 to the transmitting circuit board 10. The magnet 5 and the armature 4 may respectively serve as a stator and a rotor, or vice versa. For example, the magnet 5 may be configured as a rotor, and the armature 4 may be configured as a stator. The magnet 5 is sleeved on an outer side of the armature 4 and is farther from the main shaft 2. Since the magnet 5 does not need to be supplied with power, and the lower cartridge plate 8 is electrically connected to the armature 4 through a wired connection form to supply power to the armature 4, power supply pressure of the wireless power supply assembly can be reduced. It may be understood that, in other embodiments of the present disclosure, the magnet 5 and the armature 4 of the DC motor may also be configured as other functional roles. For example, the magnet 5 serves as a stator of the motor to be coupled to the transmitting circuit board 10, and the armature 4 serves as a rotor of the motor and may be supplied with power by the wireless power supply assembly. In addition, the driving motor in this application may also be other types of driving motors, and is not limited to a DC motor. An existing Lidar system usually adopts a disc motor, which has a complex structure. However, the Lidar system of this application adopts a DC motor. The DC motor has a simple structure and low costs, so that complexity of the Lidar system can be reduced.

During exemplary implementation, the coded disc 13 may serve as an angle measuring assembly. The coded disc 13 is disposed around the main shaft 2 and is farther from the main shaft 2 than the wireless power supply assembly, that is, the coded disc 13 is disposed at a position farthest from the main shaft 2, close to a peripheral wall of the housing of the base 1. By disposing the coded disc on the outermost side, close to the housing, accuracy of angle measurement of the coded disc can be improved. The coded disc 13 is shown in FIG. 3A, and details are not described herein again.

In addition, the cable interface 14 is configured to connect the Lidar system to other electronic devices, such as other Lidar systems or electronic devices, so that a signal inside the current Lidar system can be transmitted to outside of the current Lidar system. The cable interface 14 may be waterproof, which can prevent influence on signal transmission when water enters the Lidar system, thereby improving a waterproof capability of the radar.

An operation process of the Lidar system is as follows:

The light emitting element 19C emits, to the photoelectric sensor element 19D in a form of an optical signal, the detection instruction information transmitted by the lower cartridge plate 8, which is the so-called uplink optical signal transmission or uplink communication. The photoelectric sensor element 19D performs photoelectric conversion on the detection instruction information, and then transmits the detection instruction information to the detection apparatus 17 through the upper cartridge plate 7. The detection apparatus 17 starts a detection task after receiving the detection instruction information. Specifically, after receiving the detection instruction information, the emitting circuit board 703A controls the plurality of emitting light sources 703B to emit detection light beams to a to-be-measured space. After receiving echo light beam incident through the receiving hole 708, the photoelectric sensor elements 704B on the receiving circuit board 704A perform photoelectric conversion to generate detection result information.

The detection result information is processed by the upper cartridge plate 7 and then transmitted to the photoelectric sensor element 19B through the light emitting element 19A in the form of an optical signal, which is the so-called downlink optical signal transmission. The photoelectric sensor element 19B performs photoelectric conversion on the detection result information and then transmits the detection result information to the lower cartridge plate, and the lower cartridge plate transmits the received detection result information to a control assembly so that the control assembly may analyze and process the detection result information.

According to an exemplary embodiment of the present disclosure, different wavelengths are used for the uplink communication and the downlink communication. Compared with the uplink communication, the downlink communication has more to-be-transmitted data and a larger transmission speed. According to an example, a laser at about 904 nm may be used as an optical communication emitting unit for the downlink communication, and a red LED may be used as an optical communication emitting unit for the uplink communication. Specific structures of the uplink communication and the downlink communication are similar to those shown in FIG. 3B, and details are not described herein again.

In addition, during the operation of the Lidar system, the wireless transmitting coil 12 and the wireless receiving coil 11 rotate relative to each other, and the wireless power supply assembly can supply power to the detection apparatus 17, so that the detection apparatus 17 performs a detection task. In addition, the coded disc 10 for angle measurement measures the rotation angle of the radar during the operation of the Lidar system.

For the through main shaft configuration of the existing Lidar system, reflecting mirrors need to be disposed for a light emitting path and a light receiving path to avoid the main shaft. However, the non-through main shaft structure of this application forms a flat platform at the lower part of the Lidar system. Therefore, there is no shielding of a light path by the main shaft, and no reflecting mirrors that deflect the light path, that is, an emitting light path and a receiving light path can be substantially disposed in parallel. For example, for the above 4×16 emitting light sources 703B and corresponding 4×16 photoelectric sensor elements 704B, two groups of reflecting mirrors may be omitted. The multi-line Lidar system can omit a complex adjustment process of emitting and receiving beams in a one-to-one manner, thereby reducing optical adjustment or omitting optical adjustment.

Further technical solutions of this application are summarized in the following embodiments.

Embodiment 1 may include a detection apparatus of a Lidar system. The detection apparatus includes: a lens tube, a light beam emitting device, an emitting lens assembly, a receiving lens assembly, and a photoelectric processing device.

The lens tube includes an emitting support and a receiving support, where the emitting support and the receiving support extend in directions parallel to each other.

The emitting lens assembly is located inside the emitting support and is located on a light path of a detection light beam emitted by the light beam emitting device.

The receiving lens assembly is located inside the receiving support and is located on a light path of an echo light beam received by the photoelectric processing device.

Embodiment 2 may include the detection apparatus of a Lidar system according to Embodiment 1, and the detection apparatus further includes a light isolating plate disposed between the emitting support and the receiving support, parallel to directions in which the emitting support and the receiving support extend.

Embodiment 3 may include the detection apparatus of a Lidar system according to Embodiment 1 or Embodiment 2, where the light beam emitting device includes an emitting circuit board located outside the emitting support and disposed at a rear end of the emitting support, where the rear end of the emitting support is one end of the emitting support opposite to the other end from which the detection light beam exits; and the photoelectric processing device includes a receiving circuit board located outside the receiving support and disposed at a rear end of the receiving support, where the rear end of the receiving support is one end of the receiving support opposite to the other end that receives the echo light beam.

Embodiment 4 may include the detection apparatus of a Lidar system according to any of Embodiments 1 to 3, and the detection apparatus further includes:

an emitting magnetic isolating member disposed at a rear end of the emitting circuit board and configured to shield from an electromagnetic signal generated by the emitting circuit board; and a receiving magnetic isolating member disposed at a rear end of the receiving circuit board and configured to shield from an electromagnetic signal generated by the receiving circuit board.

Embodiment 5 may include the detection apparatus of a Lidar system according to any of Embodiments 1 to 4, where the light beam emitting device further includes emitting light sources, and the photoelectric processing device further includes photoelectric sensor elements, where m×n emitting light sources are disposed on the emitting circuit board; and i×j photoelectric sensor elements are disposed on the receiving circuit board, where m, n, i, and j are natural numbers greater than 1.

Embodiment 6 may include the detection apparatus of a Lidar system according to any of Embodiments 1 to 5, where the emitting support has an emitting hole on an end surface of a front end of the emitting support, and the detection light beam is adapted to be emitted from the emitting support through the emitting hole; the receiving support has a receiving hole on an end surface of a front end of the receiving support, and the echo light beam is adapted to be incident on the receiving support through the receiving hole; and the lens tube further includes an emitting light shielding plate and a receiving light shielding plate, where the emitting light shielding plate is located on an outer side of the end surface of the front end of the emitting support and is perpendicular to the end surface of the front end of the emitting support, and the receiving light shielding plate is located on an outer side of the end surface of the front end of the receiving support and is perpendicular to the end surface of the front end of the receiving support.

Embodiment 7 may include the detection apparatus of a Lidar system according to any of Embodiments 1 to 6, where at least one groove is provided on an inner wall of the emitting support for fixing the emitting lens assembly; and at least one groove is provided on an inner wall of the receiving support for fixing the receiving lens assembly.

Embodiment 8 may include the detection apparatus of a Lidar system according to Embodiment 1, and the detection apparatus further includes a supporting platform, where the lens tube, the light beam emitting device, the emitting lens assembly, the receiving lens assembly, and the photoelectric processing device are located above the supporting platform and are fixedly disposed relative to the supporting platform.

Embodiment 9 may include a Lidar system, including: the detection apparatus according to Embodiment 8, a main shaft, an upper cartridge plate, a top cover, and a base.

The upper cartridge plate is fixedly disposed relative to the detection apparatus, is located below the supporting platform of the detection apparatus, and is closer to the base than to the top cover in an axial direction of the detection apparatus.

The main shaft is disposed perpendicular to the base and is located between the upper cartridge plate and the base.

The detection apparatus is rotatable about the main shaft by 360°.

Embodiment 10 may include the Lidar system according to Embodiment 9, and the Lidar system further includes a rotatory support and a driving motor.

The rotatory support includes a first portion and a second portion, where the first portion is a hollow structure and is adapted to be sleeved on the main shaft, and the second portion is a disc surface structure perpendicular to the first portion, is adapted to support the supporting platform, and includes at least three rotatory sub-supports, where first ends of the rotatory sub-supports are coupled to the first portion, and second ends of the rotatory sub-supports are coupled to an edge of a disc surface of the second portion, and where the driving motor is adapted to drive, through the rotatory support, the supporting platform to rotate.

Embodiment 11 may include the Lidar system according to Embodiment 9 or Embodiment 10, and further includes a housing located above the base and connected to a periphery of the supporting platform of the detection apparatus.

Embodiment 12 may include the Lidar system according to Embodiment 10, and the Lidar system further includes a communication assembly.

The main shaft is configured as a hollow structure, and the communication assembly is disposed inside the main shaft.

Embodiment 13 may include the Lidar system according to Embodiment 12, where the communication assembly includes a first communication module and a second communication module, where the first communication module is fixed relative to the detection apparatus, and the second communication module is fixed relative to the base; and the first communication module includes at least one light emitting element, and the second communication module includes at least one photoelectric sensor element, where the at least one photoelectric sensor element of the second communication module is located on a light path of a light beam emitted by the at least one light emitting element of the first communication module.

Embodiment 14 may include the Lidar system according to Embodiment 13, where the second communication module further includes at least one light emitting element, and the first communication module further includes at least one photoelectric sensor element, where the at least one photoelectric sensor element of the first communication module is located on a light path of a light beam emitted by the at least one light emitting element of the second communication module.

Embodiment 15 may include the Lidar system according to Embodiment 14, where a wavelength of the light beam emitted by the at least one light emitting element of the first communication module is different from a wavelength of the light beam emitted by the at least one light emitting element of the second communication module.

Third Aspect

Illustrative embodiments of the third aspect of this application include, but are not limited to, a detection apparatus of a Lidar system. The third aspect of this application is mainly based on the above second aspect. Therefore, in the following description, differences from the second aspect are mainly described, and the same or similar content is not described herein again.

Figure 12:
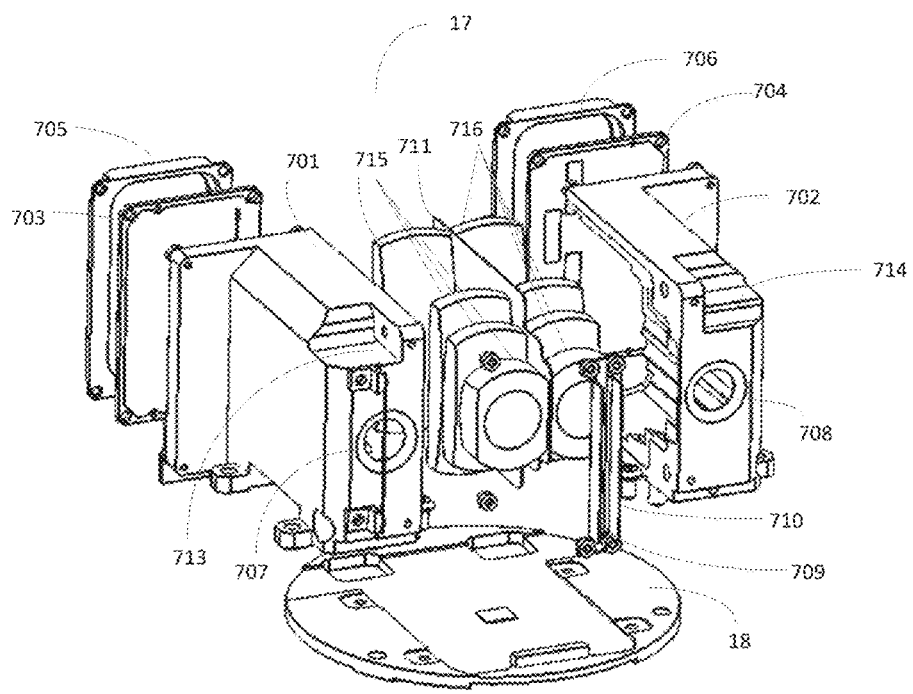
FIG. 12 is an exploded view of a detection apparatus of a Lidar system according to a third aspect of this application.

FIG. 12 is an exploded view of a detection apparatus (a radar rotor) 17 of a Lidar system according to the third aspect of this application, which is disposed in the housing 16 shown in FIG. 1, for example. FIG. 12 is similar to the structure shown in FIG. 7, and additionally shows an emitting lens assembly 715 and a receiving lens assembly 716. Detailed description is given below.

As shown in FIG. 12, the emitting support 701 and the receiving support 702 are substantially symmetrical structures, which are disposed on the supporting platform 18. The supporting platform 18 is, for example, substantially circular. Therefore, a joint between the emitting support 701 and the receiving support 702 (for example, a position of the light isolating plate 711) may be substantially located on a diameter of the supporting platform 18, so that a weight of the detection apparatus 17 is evenly distributed on the supporting platform 18 as much as possible, thereby minimizing possible imbalance during high-speed rotation.

As shown in FIG. 12, the emitting lens assembly 715 includes, for example, a plurality of lenses disposed in the groove 712 inside the emitting support 701 (as shown in FIG. 7B). The emitting lens assembly 715 may include, for example, optical devices such as a collimator and a converging lens. A light beam emitting device 703 is disposed at the rear end of the emitting support 701. During use, a detection light beam emitted by the light beam emitting device 703 passes through the emitting hole 707 to a to-be-measured space after being modulated and shaped by the emitting lens group 715.

Figure 12A:
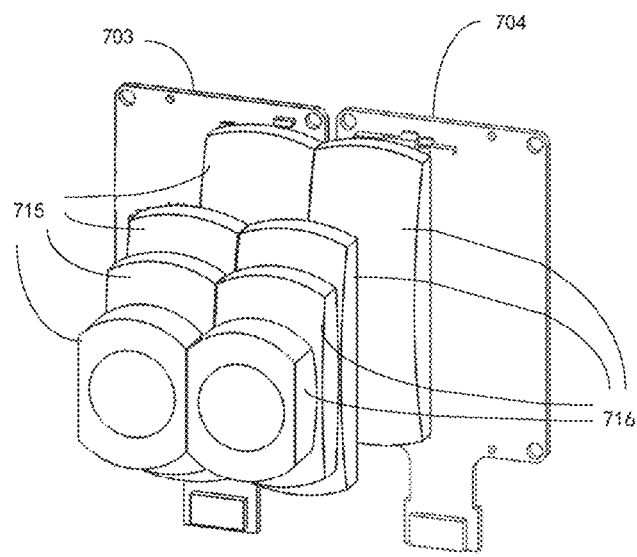
FIG. 12A is a schematic exploded view of an emitting lens assembly, a receiving lens assembly, a light beam emitting device, and a light beam receiving device.

As shown in FIG. 12, the receiving lens assembly 716 may include, for example, a plurality of lenses disposed in a groove 712\* of the receiving support 702 (as shown in FIG. 7A). The receiving lens assembly 716 includes, for example, optical devices such as a converging lens. During use, an echo light beam is incident on the receiving support 702 through the receiving hole 708, converged by the receiving lens assembly 716, and then incident on the photoelectric sensor element 704B on the receiving circuit board 704A. FIG. 12A is a schematic exploded view of the emitting lens assembly 715, the receiving lens assembly 716, the light beam emitting device 703, and the light beam receiving device 704.

Figure 13:
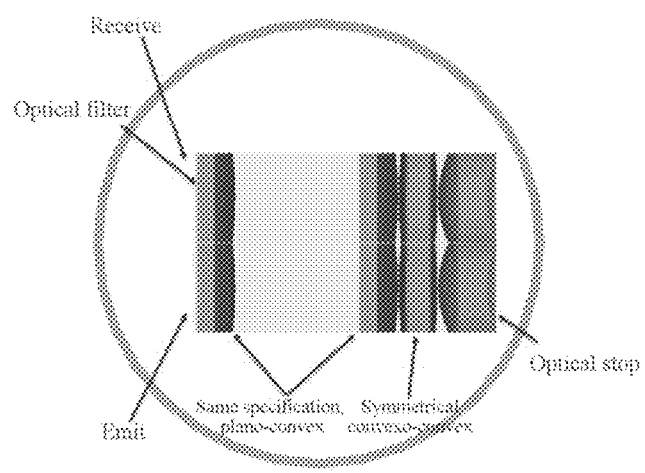
FIG. 13 is a schematic diagram of the emitting lens assembly and the receiving lens assembly.
Figure 14A:
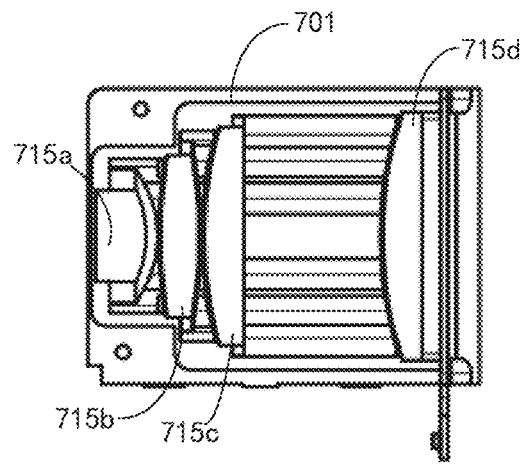
FIG. 14A is a schematic diagram of the emitting lens assembly disposed in a groove inside the emitting support.
Figure 14B:
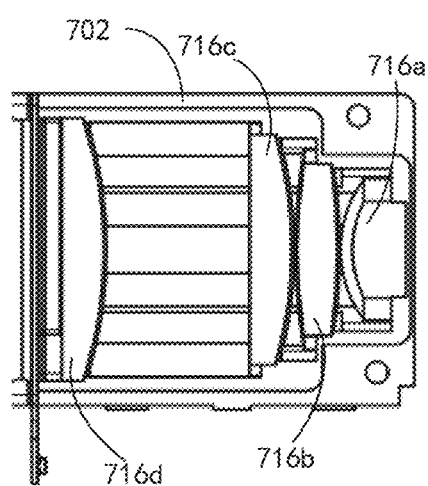
FIG. 14B is a schematic diagram of the receiving lens assembly disposed in a groove in the receiving support.

FIG. 13 is a schematic diagram of the emitting lens assembly 715 and the receiving lens assembly 716. FIG. 14A is a schematic diagram of the emitting lens assembly 715 disposed in the groove 712 inside the emitting support 701. FIG. 14B is a schematic diagram of the receiving lens assembly 716 disposed in the groove 712* in the receiving support 702.

Referring to FIG. 13, FIG. 14A, and FIG. 14B, the emitting lens assembly 715 includes two plano-convex lenses (preferably, plano-convex lenses of the same specification, namely, lenses 715c and 715d), a symmetrical convexo-convex lens (that is, a lens 715b), and an optical stop (close to a side of the emitting hole 707, that is, a lens 715a), and the receiving lens assembly 716 includes a lens 716a, a lens 716b, a lens 716c, and an optical filter (that is, an optical filter 716d) on a side away from the receiving hole 708 for filtering stray light. According to an embodiment of this application, the emitting lens assembly 715 is a telecentric lens group. The lens 715d is disposed close to the light beam emitting device 703, and may receive a laser beam from the light beam emitting device 703. After being deflected, the light beam is incident on other lens assemblies such as a collimating lens which is configured to collimate and emit the deflected laser beam.

In addition, according to an exemplary embodiment of the present disclosure, the lens 716d in the receiving lens assembly 716 that is closest to the light beam receiving device 704 and the lens 715d in the emitting lens assembly 715 that is closest to the light beam emitting device 703 are located in the middle of the supporting platform and are substantially located on the same plane, and a line connecting the two or an overall center of gravity passes through the center of the supporting platform 18. Generally, sizes and weights of the lens 716d and the lens 715d are both relatively large. Therefore, disposing the two in the middle of the supporting platform facilitates reduction of a moment of inertia of the detection apparatus 17 during high-speed rotation.

In addition, similar to FIG. 7, the stepped structure 713 disposed on an outer end of the emitting support 701 and the stepped structure 714 disposed on an outer end of the receiving support 702 can reduce weights of the emitting support 701 and the receiving support 702. In addition, since the stepped structures are located at the outer ends, the moment of inertia of the detection apparatus 17 during the high-speed rotation can also be reduced.

Figure 15:
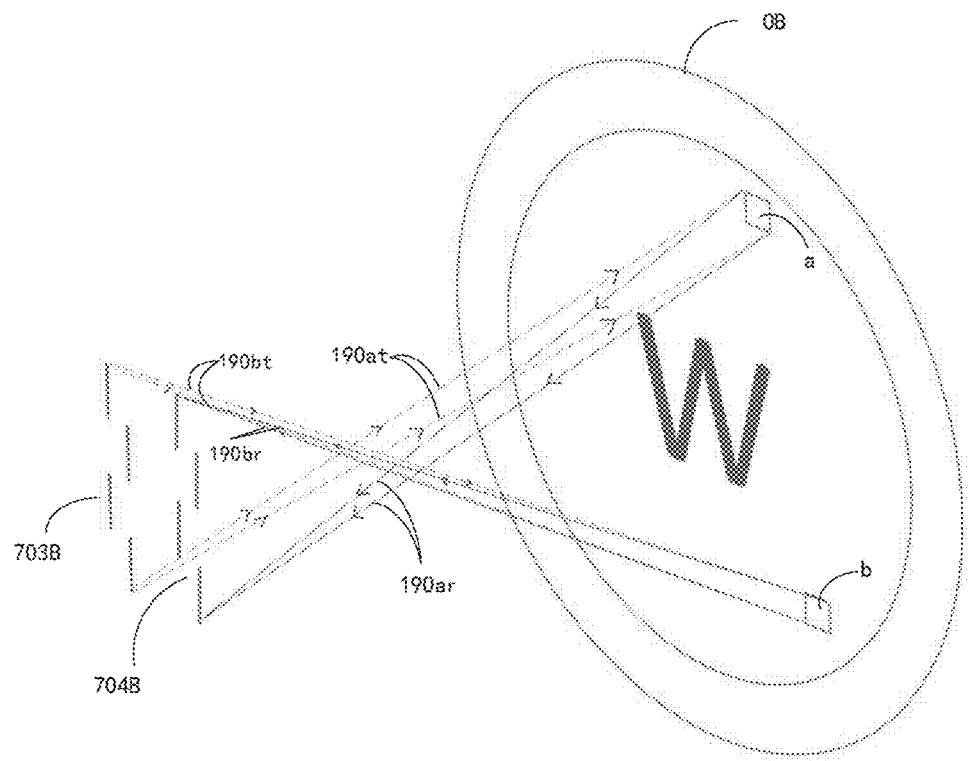
FIG. 15 is a schematic diagram of a light path for detection by the Lidar system.

FIG. 8 shows that the light beam emitting device 703 includes four groups of emitting light sources 703B, where each group of 16 emitting light sources 703B are arranged in a row in a vertical direction, for example. The light beam receiving device 704 further includes four groups of photoelectric sensor elements 704B, where each group of 16 photoelectric sensor elements 704B are preferably arranged in a row in a vertical direction. FIG. 15 is a schematic diagram of a light path for detection by the Lidar system. For ease of discussion, the emitting lens assembly and the receiving lens assembly are omitted.

In FIG. 15, OB represents a to-be-detected object. As shown in FIG. 15, a part of a light beam exiting from the emitting light source 703B is incident on the to-be-detected object OB (a square on the to-be-detected object OB represents a light spot generated on the to-be-detected object OB by the light beam from the emitting light source 703B), which generates diffuse reflection, and then a part of the light beam is reflected back to the photoelectric sensor element 704B. For example, an exiting light beam 190at is incident on the to-be-detected object OB and generates a light spot a, which generates diffuse reflection, and a partial light beam 190ar is received by one of receiving units of the photoelectric sensor element 704B. For another example, an exiting light beam 190bt is incident on the to-be-detected object OB and generates a light spot b, which generates diffuse reflection, and a partial light beam 190br is received by another of the receiving units of the photoelectric sensor element 704B. A signal generated by the photoelectric sensor element 704B is subjected to signal processing such as amplification and filtering, and is then further processed, so that parameters such as a distance, an orientation, and the like of the to-be-detected object OB can be obtained. It should be appreciated that a number correspondence between emitting units and receiving units in this application includes a plurality of correspondences, such as a one-to-one correspondence, one emitting unit corresponding to a plurality of receiving units, or a plurality of emitting units corresponding to one receiving unit. In addition, a relative position relationship between the emitting units and the receiving units that substantially correspond to each other is consistent. For example, the emitting unit that emits the light beam 190at is at a relatively bottom position of a column formed by all of the emitting light sources 703B, and the receiving unit that receives the light beam 190ar is substantially at a relatively bottom position of a column formed by all of the photoelectric sensor elements 704B. The emitting unit that emits the light beam 190bt is at a relatively top position of the column formed by all of the emitting light sources 703B, and the receiving unit that receives the light beam 190br is substantially at a relatively top position of the column formed by all of the photoelectric sensor elements 704B.

Figure 16:
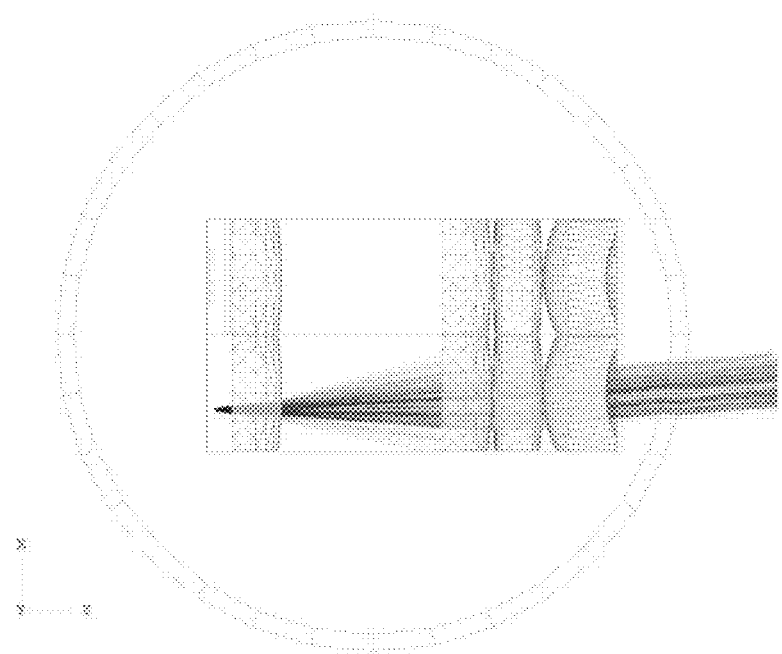
FIG. 16 is a light path change of a light beam exiting from a group of emitting light sources after passing through the emitting lens assembly, in an emitting light path.
Figure 17:
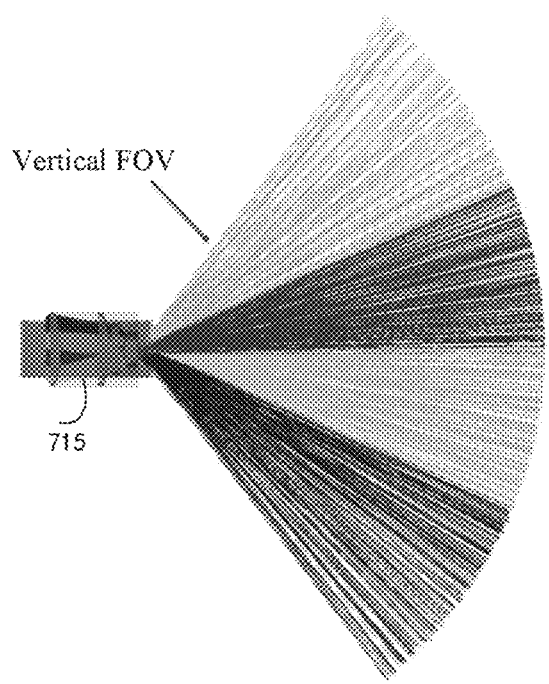
FIG. 17 schematically shows a field of view formed by four groups of emitting light sources.
Figure 18:
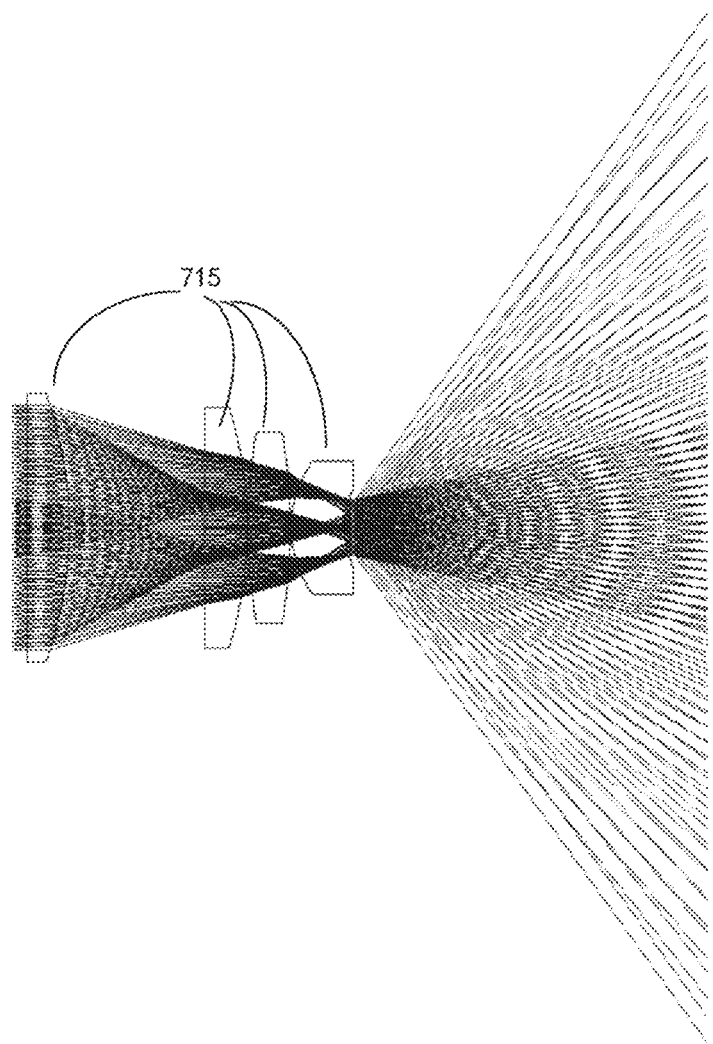
FIG. 18 shows scan line distribution of the field of view formed by the four groups of emitting light sources.

FIG. 16 is a light path change of a light beam exiting from a group of emitting light sources 703B after passing through the emitting lens assembly, in an emitting light path. FIG. 17 schematically shows a field of view formed by four groups of emitting light sources 703B. Yellow, red, green, and blue in FIG. 17 respectively correspond to exiting light of the four groups of emitting light sources 703B, and exiting purple light in FIG. 16 corresponds to the exiting red light on the right in FIG. 17. As shown in FIG. 17, a longitudinal field of view of the detection apparatus 17 of the Lidar system is about 106°. Angular resolution at a center of the field of view is the smallest, which is 1.5°, angular resolution at an edge of the field of view is the largest, which is 2.3°, and average angular resolution of the full field of view is about 1.7°. Scan line distribution is shown in FIG. 18.

Figure 19:
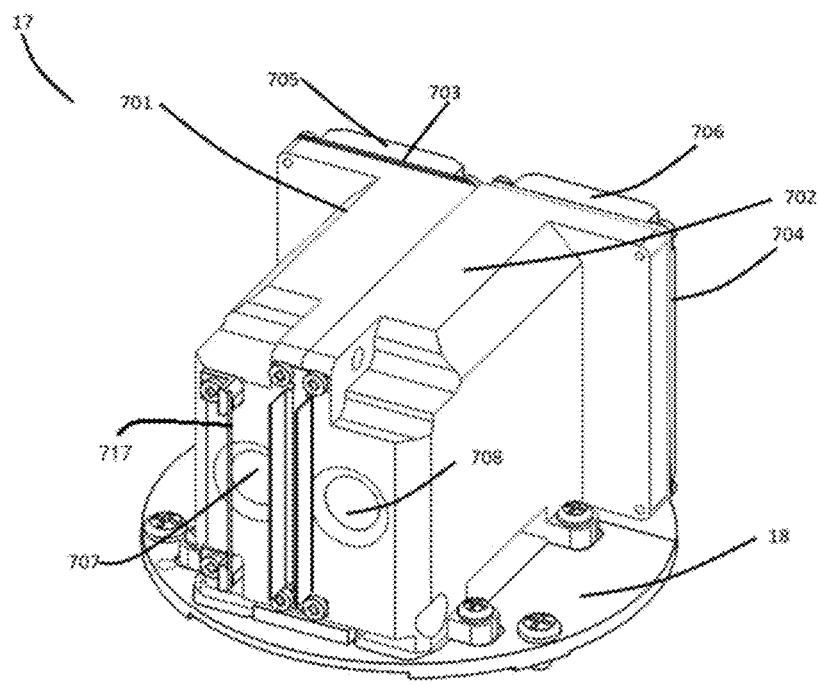
FIG. 19 shows a detection apparatus of a Lidar system according to an embodiment of this application.

FIG. 19 shows a detection apparatus 17 of a Lidar system according to an embodiment of this application. Compared with the structure in FIG. 6, in the detection apparatus 17 in FIG. 19, an optical fiber 717 is disposed in front of the emitting hole 707 to scatter a part of exiting light energy or an exiting light beam, so as to provide a compensation solution for a near-field detection blind zone without increasing a background noise of a detector. Specifically, the optical fiber 717 may be disposed on a relatively outer side of a center of the emitting hole 707, which can prevent excessive exiting light beams from being scattered by the optical fiber 717. Such compensation method for a near-field detection blind zone is particularly advantageous when the photoelectric sensor element 704B, as shown in FIG. 8, adopts a Silicon photomultipliers (SiPM) detector. A lower limit of a power response of the SiPM detector is very low. Therefore, the blind zone usually cannot be compensated by compensating for a lateral field of view at the receiving terminal. Therefore, at the emitting front end, a compensation solution for the blind zone in which a single optical fiber scatters a part of the light energy into a receiving line of sight is designed, so as to avoid increasing the background noise of the detector. By adding the optical fiber 717, the blind zone can be shortened from 0.4 m to 0.01 m.

Fourth Aspect

The fourth aspect of this application is described in detail below with reference to the drawings and the embodiments. While the fourth aspect is described below, it should be appreciated that modifications of the description of the fourth aspect may be made based on various embodiments described in the present disclosure.

Figure 20:
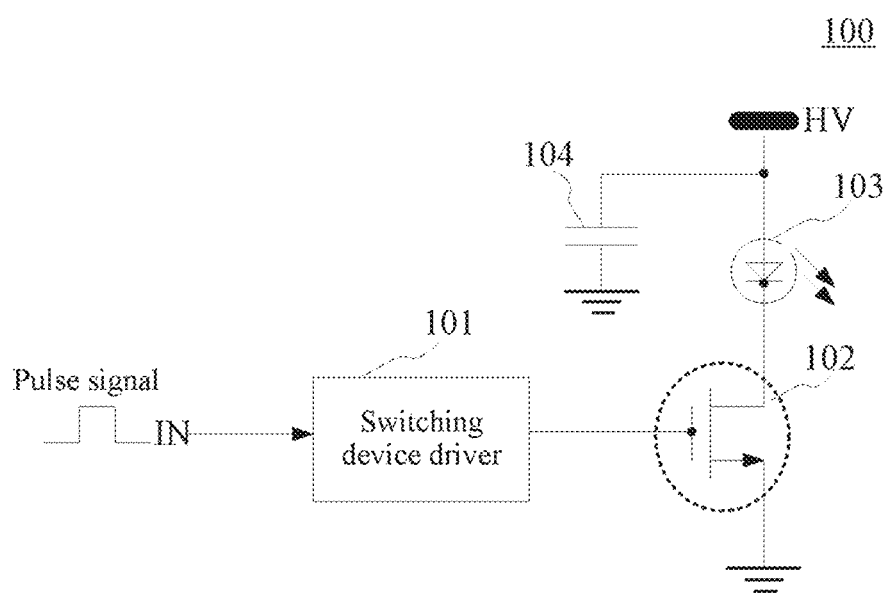
FIG. 20 is a schematic principle diagram of a driving circuit for a signal emitter of a Lidar system in the prior art.

FIG. 20 is a schematic diagram of a single-line signal emitting circuit of a Lidar system in the prior art.

As shown in FIG. 20, the single-line signal emitting circuit 100 of the Lidar system includes: a switching device driver 101, a switching device 102, a light emitting device 103, and an energy storage capacitor 104. A pulse signal is inputted to an input terminal of the switching device driver 101. An output of the switching device driver 101 is electrically connected to the switching device 102. The switching device 102 may be a switching triode. The output terminal of the switching device driver 101 may be electrically connected to a gate of the switching triode 102. A source of the switching triode is connected to the ground. An anode of the light emitting device 103 is electrically connected to a high-level (HV) signal line, and a cathode of the light emitting device is electrically connected to a drain of the switching triode 102. In addition, the energy storage capacitor 104 serves as an energy storage element. A high-level signal is inputted to one end of the energy storage capacitor, and the other end is connected to the ground. In addition, the one end of the energy storage capacitor to which the high-level signal is inputted is electrically connected to an input terminal of the light emitting device 103.

When a voltage of a pulse signal outputted by the switching device driver 101 is greater than a turn-on voltage of the switching triode 102, the drain and the source of the switching triode 102 are connected. A current flows through the light emitting device 103 and the drain and the source of the switching transistor 102 from the high-voltage signal line, so that the light emitting device 103 emits an optical signal that may be transmitted. A strength of the optical signal may be controlled through a magnitude of a signal voltage outputted by the high-level (HV) signal line. In addition, a duration of the optical signal emitted by the light emitting device 103 may be controlled through the pulse signal outputted by the switching device driver 101.

A multi-line Lidar system usually includes a plurality of light emitting devices. In the prior art, one switching device driver is disposed for each light emitting device. On the one hand, a volume of the Lidar system cannot be reduced. On the other hand, due to relatively high costs of the switching device driver, costs of the multi-line Lidar system are also relatively high.

In order to resolve the above problems, this application adopts a signal distributor in the emitting circuit of the Lidar system to drive more switching devices with fewer switching device drivers, so as to reduce a number of devices included in the emitting circuit of the Lidar system, thus reducing the volume of the Lidar system. In addition, since costs of the signal distributor is lower than the costs of the switching device driver, the costs of the Lidar system can be reduced, facilitating further popularization of the Lidar system.

Figure 21:
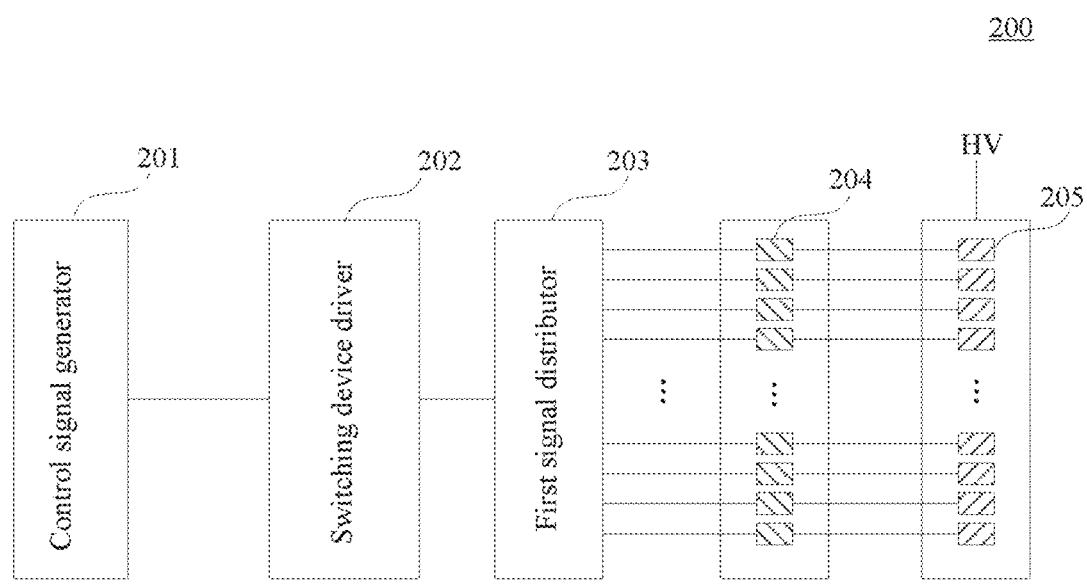
FIG. 21 is a structural diagram of an emitting circuit of a Lidar system according to an embodiment of this application.

FIG. 21 is a structural diagram of an emitting circuit 200 of a Lidar system according to an embodiment of this application.

As shown in FIG. 21, the emitting circuit 200 of the Lidar system includes a control signal generator 201, a switching device driver 202, a first signal distributor 203, a plurality of switching devices 204, and a plurality of light emitting devices 205.

In this embodiment, a number of light emitting devices 205 may be any integer greater than 1, for example, 16, 26, 32, 64, or the like.

A number of switching devices 204 may be equal to the number of light emitting devices. The switching devices 204 are in a one-to-one correspondence with the light emitting devices 205.

The switching device driver 202 is adapted to drive the switching device 204.

An output terminal of the control signal generator 201 is electrically connected to an input terminal of the switching device driver 202. An output terminal of the switching device driver 202 is electrically connected to a signal input terminal of the first signal distributor 203. The first signal distributor 203 includes a plurality of output terminals. Each of the output terminals of the first signal distributor 203 corresponds to one switching device 204. Each of the output terminals of the first signal distributor 203 is electrically connected to an input terminal of a switching device 204 (for example, a gate of a switching triode) corresponding to the output terminal. Each of the switching devices 204 corresponds to one light emitting device 205. For each of the switching devices 204, a drain of the switching device 204 is electrically connected to a cathode of a light emitting device 205 corresponding to the switching device 204, and an anode of the light emitting device 205 corresponding to the switching device 204 is electrically connected to a high level (HV) signal line.

The control signal generator 201 is configured to generate a trigger signal. Generally, a positive amplitude and a negative amplitude of the trigger signal may not match a turn-on voltage and a pinch-off voltage of the switching device.

A function of the switching device driver 202 is to turn on and drive the switching device 204 under triggering of the trigger signal generated by the control signal generator 201. A width of a pulse outputted by the switching device driver 202 is used to control an on time of the switching device 204, thereby controlling a duration in which the light emitting device emits an optical signal. The signal outputted by the switching device driver 202 may be used to control the switching device 204 to be turned on and turned off.

In some application scenarios, the switching device driver may be a Gallium nitride (GaN) switching device driver. The GaN switching device driver is simply designed and can achieve an extremely fast propagation delay of 2.5 nanoseconds and a minimum pulse width of 1 nanosecond. Using the GaN switching device driver leads to a more accurate control signal of the switching device. The GaN switching device driver may be configured to control various switching devices.

The first signal distributor 203 includes one signal input terminal, a plurality of output terminals, and at least one address signal input terminal. A number of output terminals of the first signal distributor 203 may match the number of light emitting devices 205 used in the emitting circuit of the Lidar system. The number of output terminals of the first signal distributor 203 may be greater than or equal to the number of light emitting devices 205. An address signal may be inputted to the at least one address signal input terminal of the first signal distributor 203. An output terminal corresponding to the address signal may be determined according to the address signal. The first signal distributor 203 may transmit, to the output terminal determined according to the address signal, a pulse signal inputted to the first signal distributor 203 and converted by the switching device driver.

In this embodiment, the switching device 204 may be various types of switching triodes, such as a silicon-based field effect transistor, a silicon-based MOS transistor, or the like.

In some application scenarios, the switching device 204 may be a GaN switching device, such as a silicon-based GaN field effect transistor, a GaN-based field effect transistor, or the like.

The GaN switching device is resistant to a high temperature and easy to integrate, and has a fast response speed, and therefore may serve as a switching device of the multi-line Lidar system.

Corresponding to the application scenarios, the above switching device driver 202 may be a GaN switching device driver.

The above light emitting devices 205 each may be various types of light emitting devices. In some application scenarios, the light emitting device may be an inorganic semiconductor light emitting device such as a semiconductor light-emitting diode (LED), a vertical cavity surface emitting laser (Vcsel), an edge emitting laser (EEL), or the like.

In this embodiment, a number of switching device drivers 202 may be one. The number of output terminals of the first signal distributor 203 may match the number of switching devices 204. In this way, all of the switching devices can be driven by using one switching device. Compared with disposing one corresponding switching device driver for each switching device 204, the number of switching device drivers in the above embodiment is greatly reduced. On the one hand, the costs of the emitting circuit of the Lidar system can be reduced. On the other hand, a number of devices used in the emitting circuit of the Lidar system can be reduced, thereby reducing a volume of the emitting circuit of the Lidar system.

Figure 22:
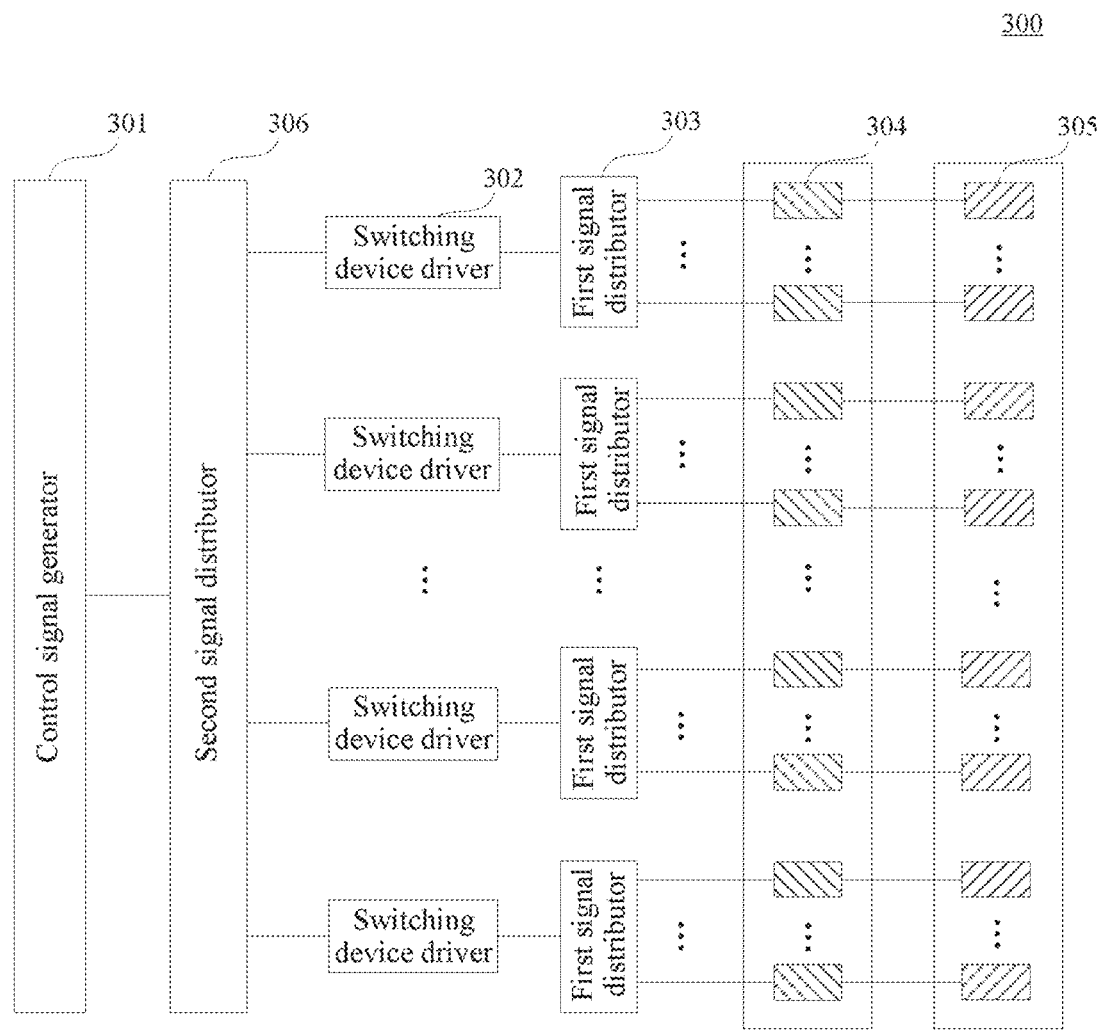
FIG. 22 is another structural diagram of an emitting circuit of the Lidar system according to an embodiment of this application.

FIG. 22 is structural diagram of an emitting circuit 300 of the Lidar system according to an embodiment of this application.

As shown in FIG. 22, the emitting circuit 300 of the Lidar system includes a control signal generator 301, at least two switching device drivers 302, at least two first signal distributors 303, a plurality of switching devices 304, a plurality of light emitting devices 305, and a second signal distributor 306.

In this embodiment, a number of light emitting devices 305 may be any integer greater than 1, for example, 16, 26, 32, 64, or the like.

A number of switching devices 304 may be equal to the number of light emitting devices. The switching devices 304 are in a one-to-one correspondence with the light emitting devices 305.

The switching device driver 302 is adapted to drive the switching device 304. A number of switching device drivers 302 is greater than or equal to 2. The number of switching device drivers 302 may be equal to a number of first signal distributors 303. The switching device drivers 302 are in a one-to-one correspondence with the first signal distributors 303.

For a connection relationship between the switching device 304 and the light emitting device 305, refer to the description of the embodiment shown in FIG. 21, and details are not described herein.

In this embodiment, the number of first signal distributors 303 may be greater than or equal to 2.

Each of the first signal distributors 303 may include one signal input terminal, at least one address signal input terminal, and at least two output terminals. A sum of numbers of output terminals of the at least two first signal distributors 303 may match the number of switching devices 304. For example, the sum of the numbers of output terminals of the first signal distributors 303 is equal to the number of switching devices 304. Each of the switching devices 304 may correspond to an output terminal of one of the first signal distributors 303.

For each of the first signal distributors 303, a signal input terminal of the first signal distributor 303 is electrically connected to a signal output terminal of a switching device driver 302 corresponding to the first signal distributor 303. The address signal input terminal is electrically connected to an address signal line. For each of the output terminals of the first signal distributor 303, the output terminal is electrically connected to an input terminal of switching device 304 corresponding to the output terminal.

The control signal generator 301 is electrically connected to the at least two switching device drivers 302 through the second signal distributor 306.

The second signal distributor 306 includes a first input terminal, at least one second input terminal, and at least two first output terminals. The first input terminal is electrically connected to a control signal output terminal of the control signal generator 301. The at least one second input terminal is electrically connected to a first address signal line. A number of first address signal lines may be greater than or equal to 1. At each moment, one of the first output terminals of the second signal distributor 306 may be determined according to a signal transmitted on each of the first address signal lines. Each of the first output terminals may be electrically connected to an input terminal of a switching device driver corresponding to the first output terminal. In this embodiment, the switching device drivers 302 are in a one-to-one correspondence with the first output terminals.

A number of output terminals of each of the first signal distributors 303 may be less than a number of switching devices used in the emitting circuit 300 of the Lidar system shown in FIG. 22.

A number of first output terminals of the second signal distributor 306 may match a number of switching device drivers 302 used in the emitting circuit 300 of the Lidar system shown in FIG. 22. For example, the number of first output terminals of the second signal distributor 306 may be equal to the number of switching device drivers 302 used in the emitting circuit 300 of the Lidar system.

For example, the number of light emitting devices 305 is 64. The number of first output terminals of the second signal distributor 306 may be 2, and the number of output terminals of the first signal distributor may be 32. Alternatively, the number of first output terminals of the second signal distributor is 4, and the number of output terminals of the first signal distributor may be 16. Alternatively, the number of first output terminals of the second signal distributor may be 8, and the number of output terminals of the first signal distributor may be 8.

According to the emitting circuit of the Lidar system provided in this embodiment, the first signal distributor and the second signal distributor are disposed in the emitting circuit of the Lidar system, so that the number of switching device drivers for driving a plurality of switching devices is reduced. Costs and a volume of the emitting circuit of the Lidar system can be reduced.

Figure 23:
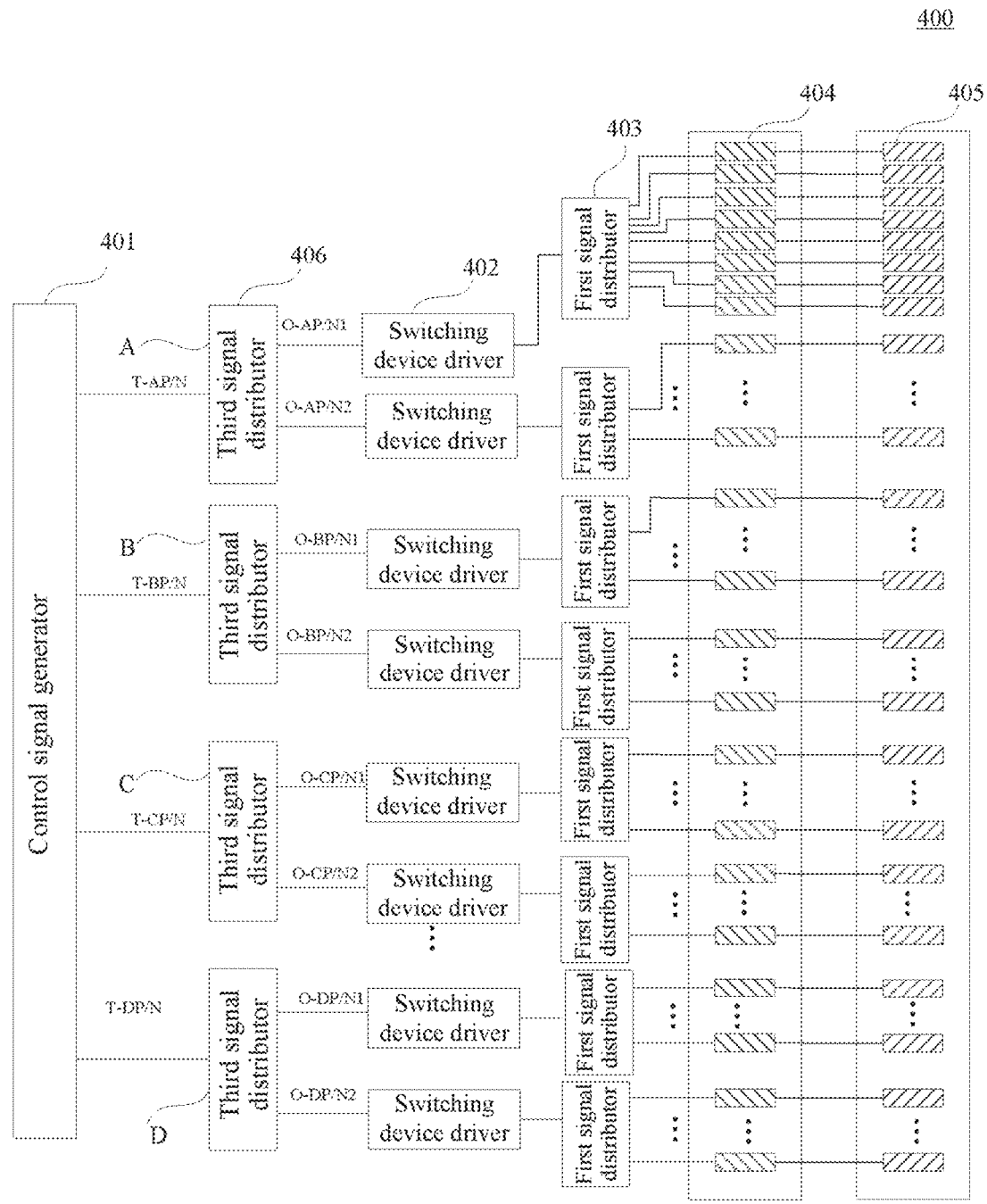
FIG. 23 is still another structural diagram of an emitting circuit of the Lidar system according to an embodiment of this application.

FIG. 23 is another structural diagram of an emitting circuit 400 of the Lidar system according to an embodiment of this application.

In this embodiment, the emitting circuit 400 of the Lidar system includes a control signal generator 401, at least two switching device drivers 402, at least two first signal distributors 403, a plurality of switching devices 404, a plurality of light emitting devices 405, and at least two third signal distributors 406.

In this embodiment, a number of light emitting devices 405 may be any integer greater than 1, for example, 16, 26, 32, 64, or the like.

A number of switching devices 404 may be equal to the number of light emitting devices 405. The switching devices 404 are in a one-to-one correspondence with the light emitting devices 405.

The switching device driver 402 is adapted to drive the switching device 404. A number of switching device drivers 402 is greater than or equal to 2. The number of switching device drivers 402 may be equal to a number of first signal distributors 403. The switching device drivers 402 are in a one-to-one correspondence with the first signal distributors 403.

For a connection relationship between the switching device 404 and the light emitting device 405, refer to the description of the embodiment shown in FIG. 21, and details are not described herein. A connection relationship between the first signal distributor 403 and the switching device driver is illustrated with reference to the embodiment shown in FIG. 22, and details are not described herein.

In this embodiment, the third signal distributors 406 each includes a third input terminal, at least one fourth input terminal, and at least two second output terminals.

The control signal generator 401 may include at least two groups of control signal output terminals. In the at least two groups of control signal output terminals of the control signal generator, one group of control signal output terminals are in an effective working state at each moment. Each group of the control signal output terminals is corresponding to one of the third signal distributors. One group of the control signal output terminals of the control signal generator 401 is electrically connected to a third input terminal of a third signal distributor corresponding to the control signal output terminals.

The at least one fourth input terminal of each of the third signal distributors 406 is electrically connected to a second address signal line. An address signal on the second address signal line is used to instruct the third signal distributor to transmit an inputted signal to an output terminal of the third signal distributor that is indicated by the address signal.

A total number of second output terminals corresponding to the at least two third signal distributors 406 may be equal to a total number of switching device drivers 402.

Each of the second output terminals corresponds to one switching device driver 402.

Each of the second output terminals is electrically connected to an input terminal of a switching device driver 402 corresponding to the second output terminal.

In this embodiment, a number of output terminals of each of the first signal distributors 403 may be less than a number of switching devices used in the emitting circuit 400 of the Lidar system shown in FIG. 23.

A sum of numbers of output terminals of the third signal distributors 406 may match a number of switching device drivers used in the emitting circuit 400 of the Lidar system shown in FIG. 23. For example, the sum of the numbers of output terminals of the third signal distributors 406 may be equal to the number of switching device drivers 402 used in the emitting circuit 400 of the Lidar system.

As shown in FIG. 23, in this embodiment, the control signal generator 401 may include 4 groups of control signal output terminals. The number of third signal distributors may be 4. The number of first signal distributors may be 8.

In some application scenarios of this embodiment, a number of light emitting devices used in the emitting circuit 400 of the Lidar system is 64. In the application scenarios, the third signal distributors each may be a 2-channel signal distributor. The first signal distributors each may be an 8-channel signal distributor.

An exemplary working process is described below. The 4 groups of control signal output terminals of the control signal generator may be respectively T-AP/N, T-BP/N, T-CP/N, and T-DP/N. The 4 third signal distributors 406 may be respectively A, B, C, and D. Trigger signals outputted by T-AP/N, T-BP/N, T-CP/N, and T-DP/N are respectively transmitted to respective third input terminals of A, B, C, and D at different moments. T-AP/N indicates a T-AP signal (positive signal) output terminal and T-AN signal (negative signal) output terminal. The same is true for T-BP/N, T-CP/N, and T-DP/N. After the trigger signal is transmitted to one of the third signal distributors (such as A, B, C, or D), for example, A, two possible output terminals corresponding to A are 0-AP/N1 and 0-AP/N2. An address signal inputted from a fourth input terminal of A may be used to control A to transmit the trigger signal to the terminal 0-AP/N1 or the terminal 0-AP/N2. If the trigger signal is transmitted to the terminal 0-AP/N1, a switching device driver electrically connected to the output terminal 0-AP/N1 is triggered to enter a working state. A driving signal transmitted by the switching device driver 402 is distributed to one of the switching devices 404 after passing through the first signal distributor 403. A length of the driving signal may be determined by using a time interval between actions of 0-AP1 and 0-AN1 on the switching device 404. A duration in which the switching device 404 is on may depend on the length of the driving signal transmitted by the switching device driver 402. When the switching device 404 is on, the light emitting device 405 emits light under action of an HV signal. Energy of a detection signal emitted by the light emitting device 405 depends on the driving signal and the HV signal. At the same moment, one of the T-AP/N, T-BP/N, T-CP/N, and T-DP/N outputs a trigger signal.

In addition, the number of control signal output terminals of the control signal generator 401 may be 4, the third signal distributor 406 may be a 4-channel signal distributor, and the number of third signal distributors 406 may be 4. The first signal distributors 403 each may be a 4-channel signal distributor. The number of first signal distributors 403 may be 16.

In addition, the number of control signal output terminals of the control signal generator 401 may be 2, the third signal distributors 406 each may be a 4-channel signal distributor, and the number of third signal distributors 406 may be 2. The first signal distributors 403 each may be an 8-channel signal distributor, and the number of first signal distributors 403 may be 8.

It may be learned from the above that, a product of the numbers of output terminals of the first signal distributors 403, the number of control signal terminals of the control generator 401, and the numbers of output terminals of the third signal distributors 406 may be set to be equal to the number of emitting devices used in the emitting circuit of the Lidar system, which can implement driving of many switching devices with few switching device drivers 402, thereby reducing the number of devices used in the signal emitting circuit and reducing costs of the Lidar system.

According to the emitting circuit of the Lidar system provided in this embodiment, the first signal distributor and the second signal distributor are disposed in the emitting circuit of the Lidar system, so that the number of switching device drivers for driving a plurality of switching devices is reduced. Costs and a volume of the emitting circuit of the Lidar system can be reduced, thereby reducing the costs and the volume of the Lidar system.

Figure 24:
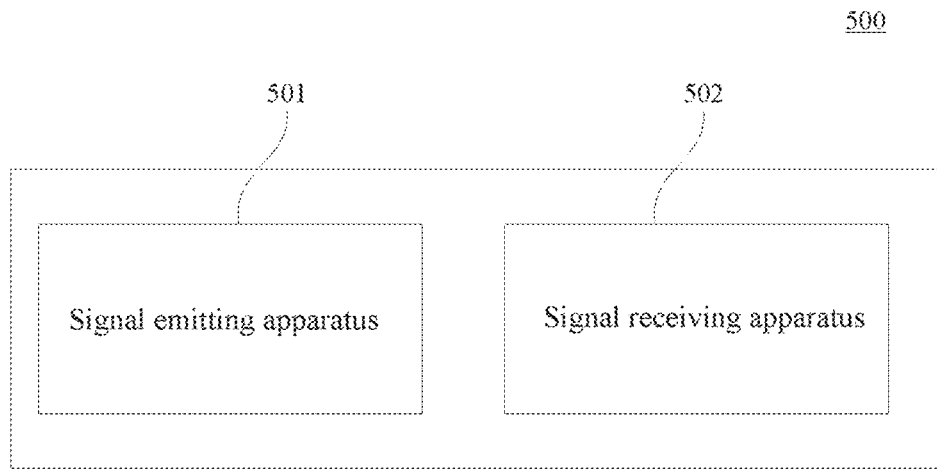
FIG. 24 is a structural diagram of a Lidar system according to an embodiment of this application.

FIG. 24 is a structural diagram of a Lidar system 500 according to an embodiment of this application.

As shown in FIG. 24, the Lidar system 500 includes a signal emitting apparatus and a signal receiving apparatus. The signal emitting apparatus includes the emitting circuit of the Lidar system shown in FIG. 21, FIG. 22, or FIG. 23.

The Lidar system may be used for distance measurement, obstacle recognition, and the like. The Lidar system may include other features mentioned in the first aspect, the second aspect, and the third aspect of this application, for example.

Figure 25:
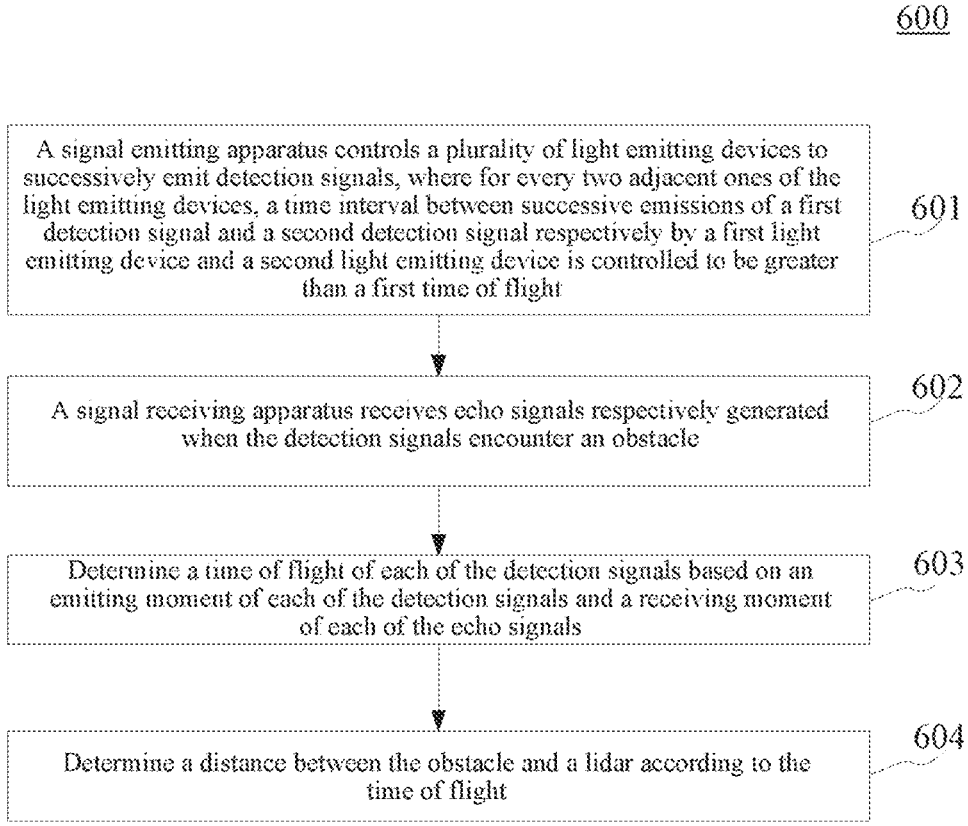
FIG. 25 is a schematic flowchart of a Lidar system-based ranging method according to an embodiment of this application.

FIG. 25 is a schematic flowchart 600 of a Lidar system ranging method according to an embodiment of this application.

In this embodiment, a Lidar system may be the Lidar system shown in FIG. 24. A signal emitting apparatus of the Lidar system may include the signal emitting circuit shown in FIG. 21, FIG. 22, or FIG. 23.

The signal emitting apparatus includes a plurality of light emitting devices. The Lidar system may control the plurality of light emitting devices to successively emit detection signals.

Every two adjacent ones of the plurality of light emitting devices are respectively regarded as a first light emitting device and a second light emitting device according to a detection signal emitting sequence. A first detection signal emitted by the first light emitting device corresponds to a first time of flight.

As shown in FIG. 25, the Lidar system ranging method may include the following steps:

At Step 601, the signal emitting apparatus controls the plurality of light emitting devices to successively emit detection signals, where for every two adjacent ones of the light emitting devices, a time interval between successive emissions of the first detection signal and a second detection signal respectively by the first light emitting device and the second light emitting device is controlled to be greater than the first time of flight.

At Step 602, the signal receiving apparatus receives echo signals respectively generated when the detection signals encounter an obstacle.

At Step 603, determine a time of flight of each of the detection signals based on an emitting moment of each of the detection signals and a receiving moment of each of the echo signals.

At Step 604, determine a distance between the obstacle and the Lidar system according to the time of flight.

In this embodiment, the two adjacent light emitting devices herein refer to two light emitting devices that are adjacent in a light emitting sequence. In some application scenarios, the two adjacent light emitting devices may also be two light emitting devices that are adjacent in space.

In this embodiment, for each of the light emitting devices, the signal emitting apparatus can control an on time transmitted to a switching device corresponding to each of the light emitting devices, to control a time in which a light emitting device emits a detection signal.

In addition, the signal emitting apparatus may further control a strength of light emitted by each of the light emitting devices by controlling a strength of an HV signal inputted to an anode of each of the light emitting devices.

For every two of the light emitting devices that are adjacent in emitting moment, a light emitting device of the two adjacent light emitting devices that emits a detection signal first may be regarded as a first light emitting device, and a light emitting device that transmits a detection signal later may be regarded as a second light emitting device. A detection signal emitting moment corresponding to the first light emitting device may be a first moment, and a detection signal emitting moment corresponding to the second light emitting device may be a second moment. A time difference between the second moment and the first moment may be greater than a first time of flight of the detection signal emitted by the first light emitting device.

A time of flight (ToF) of each detection signal may be regarded as a time interval between a moment of emitting the detection signal and a moment of receiving an echo signal formed when the detection signal encounters an obstacle.

The time interval between successive emissions of the detection signal by the two adjacent light emitting devices is set to be greater than the time of flight of the detection signal emitted earlier in the detection signals emitted by the two adjacent light emitting devices, so that crosstalk between the two adjacent light emitting devices can be reduced.

For each detection signal, a product of a time of flight of the detection signal and the speed of light may be regarded as a distance between the Lidar system and an obstacle.

In the Lidar system using a plurality of light emitting devices, the plurality of light emitting devices may obtain a plurality of initial distances between the Lidar system and an obstacle during measurement of the obstacle. Each of the initial distances corresponds to a detection signal emitted by one of the light emitting devices.

The plurality of initial distances may be combined to determine a more accurate distance between the Lidar system and the obstacle.

In some optional implementations, the above step 603 may further include: for each of the detection signals, determining the time of flight of the detection signal based on the emitting moment of the detection signal, the receiving moment of the echo signal corresponding to the detection signal, and a pre-determined compensation time.

The compensation time is mainly used to compensate for a deviation of the time of flight caused by a parasitic capacitance in the emitting circuit of the Lidar system.

The emitting circuit of the Lidar system generates a parasitic capacitance. The existing parasitic capacitance consumes a driving pulse signal inputted from a gate of the switching device. For example, a moment when the driving pulse signal transmitted by the switching device driver reaches a turn-on voltage of the light emitting device is a reference moment. The existing parasitic capacitance causes an actual turn-on moment of the light emitting device to be later than the reference moment. If the time of flight of the detection signal is calculated by using the reference moment, an actual time of flight of the detection signal is less than a measured time of flight of the detection signal. As a result, the distance between the Lidar system and the obstacle measured by the Lidar system is inaccurate.

A calibration test method may be used to measure the time difference between the actual turn-on moment of the light emitting device and the reference moment, and the time difference is used as the compensation time. During calculation of the time of flight of the detection signal, a difference between the time interval between the reference moment when the light emitting device emits the detection signal and the moment of receiving the echo signal generated when the detection signal encounters an obstacle and the compensation time is determined as the time of flight of the detection signal used to calculate the distance.

By compensating for the time of flight of the detection signal, the time of flight of the detection signal used to calculate the distance is much closer to the actual time of flight of the detection signal, so that the measured distance between the Lidar system and the obstacle is more accurate.

An embodiment of this application further provides a signal processing method applicable to the Lidar system. The method includes:

outputting a trigger signal to the switching device driver through the control signal generator;

successively outputting, to the switching device through the first signal distributor, driving signals outputted by the at least one switching device driver, so as to control the switching device to be turned on/off; and controlling the light emitting device to emit light by turning on/off the switching device.

The fourth aspect of this application relates to the emitting circuit of the Lidar system and the signal processing method for the emitting terminal. The emitting circuits 200, 300, and 400 and the signal processing method may be combined with the Lidar systems of the first, second, and third aspects of this application, for example, used as the emitting circuits of the Lidar systems and the signal processing method. For example, referring to FIG. 7 and FIG. 8, a light beam emitting device 703 is disposed outside a rear end of the emitting support 701, and the light beam emitting device 703 includes an emitting circuit board 703A and m×n emitting light sources 703B. The light emitting devices 205, 305, and 405 in the emitting circuit of the fourth aspect of this application may be used as the emitting light source 703B in FIG. 8. In addition, for example, other devices of the emitting circuit of the fourth aspect of this application, such as the control signal generator, the switching device driver, the first signal distributor, the second signal distributor, the third signal distributor, and the plurality of switching devices may also be integrated on the emitting circuit board 703A. In this way, the technical solutions and the signal processing method for the emitting circuit of the Lidar system of the fourth aspect of this application can be combined into the above Lidar system of the various embodiments of the other described aspects. This combination is easily understood for those skilled in the art and does not require creative work. Details are not described herein again.

Fifth Aspect

A fifth aspect of the present disclosure is discussed below. While this fifth aspect is described is its own section of the disclosure, variations of the following description may be made in conjunction with the various embodiments of the other described aspects.

Figure 26:
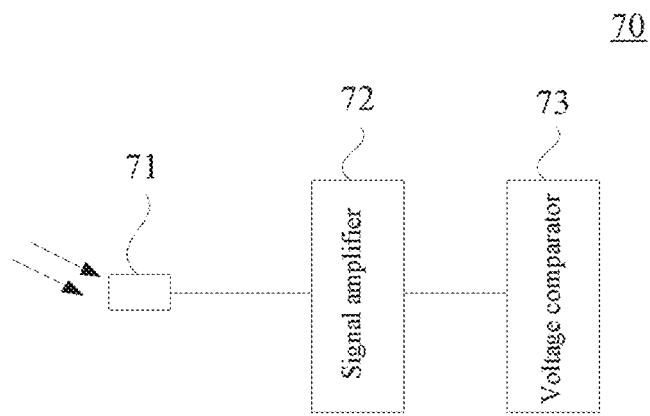
FIG. 26 is a schematic principle diagram of a signal receiver for the Lidar system in the prior art.

FIG. 26 is a schematic principle diagram of a signal receiver for the Lidar system in the prior art.

The signal receiver of the Lidar system may include a plurality of photoelectric signal receivers. The photoelectric signal receiver is configured to convert a received optical signal into an electrical signal.

As shown in FIG. 26, a signal receiving circuit in the existing Lidar system includes a plurality of signal receiving subunits 70. Each of the signal receiving subunits 70 includes a photoelectric signal receiver 71, a signal amplifier 72, and a voltage comparator 73.

Each of the signal receiving subunits 70 may correspond to one light emitting device of an emitting apparatus of the Lidar system. For each of the signal receiving subunits 70, the photoelectric signal receiver 71 in the signal receiving subunit 70 may receive an echo signal returned when a detection signal transmitted by a light emitting device corresponding to the signal receiving subunit 70 encounters an obstacle. The echo signal herein is a relatively weak optical signal. The echo signal is converted to an electrical signal. The signal amplifier 72 in the signal receiving subunit 70 amplifies the electric signal. The amplified electrical signal is a continuous voltage signal. The voltage comparator 73 in the signal receiving subunit 70 is configured to convert the continuous voltage signal to a pulse voltage signal.

The echo signal may be further analyzed according to the pulse voltage signal.

Since the existing Lidar system is a multi-line Lidar system, the emitting terminal includes a plurality of light emitting devices. Correspondingly, the signal receiving terminal may include a plurality of photoelectric signal receivers. A corresponding signal amplifier needs to be disposed for each of the photoelectric signal receivers. As a result, the Lidar system includes a relatively large number of devices, which costs relatively high and impedes large-scale promotion of the Lidar system.

In view of the above problems, the technical solutions provided in the embodiments of this application may be used.

Figure 27:
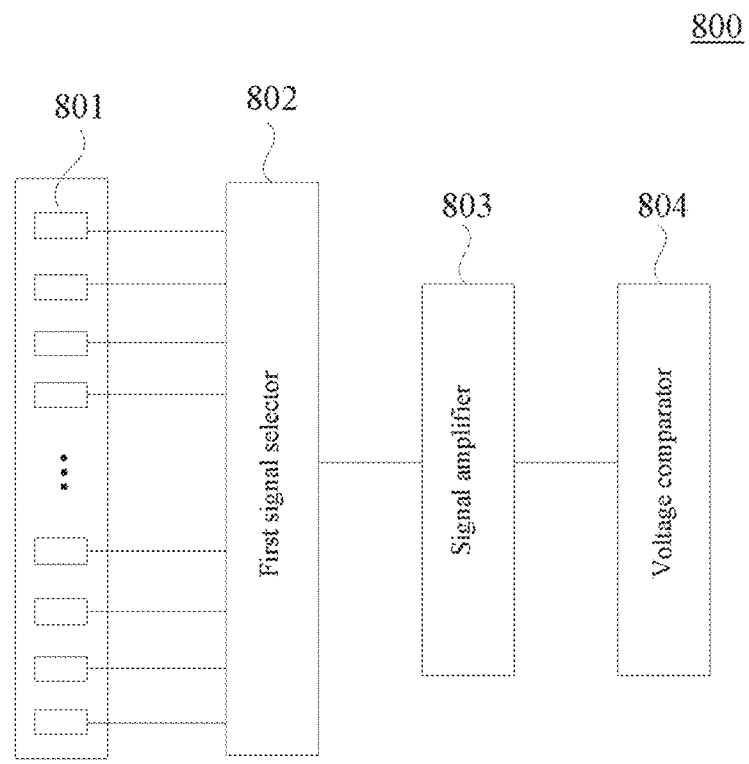
FIG. 27 is a structural diagram of a receiving circuit of the Lidar system according to an embodiment of this application.

FIG. 27 is a structural diagram of a receiving circuit of the Lidar system according to an embodiment of this application.

As shown in FIG. 27, a receiving circuit 800 of the Lidar system includes a plurality of photoelectric signal receivers 801, a first signal selector 802, a signal amplifier 803, and a voltage comparator 804.

A number of photoelectric signal receivers 801 may be any natural number greater than or equal to 1, for example, 8, 16, 24, 64, or the like. The number of photoelectric signal receivers may be set according to specific application scenarios. The photoelectric signal receiver may be, for example, a phototube, a photomultiplier, a silicon photocell, a photodiode, an avalanche photodiode, a PIN photodiode, a silicon photomultiplier (SiPM), a single photon avalanche diode (Spad), or the like.

For each of the photoelectric signal receivers, a working time of the photoelectric signal receiver may be controlled to match a time in which a light emitting device of the signal emitting terminal of the Lidar system emits a detection signal corresponding to the photoelectric signal receiver to the photoelectric signal receiver. For example, for one photoelectric signal receiver, a working time of the photoelectric signal receiver may be controlled to start from a moment when the light emitting device of the signal emitting terminal of the Lidar system that corresponds to the photoelectric signal receiver emits the detection signal and end at a moment when the photoelectric signal receiver receives an echo signal of the detection signal.

In this embodiment, an output terminal of each of the photoelectric signal receivers 801 may correspond to a signal input terminal of the first signal selector 802. The output terminal of each of the photoelectric signal receivers 801 may be electrically connected to a signal input terminal of the first signal selector 802 that corresponds to the output terminal of the photoelectric signal receiver 801. The first signal selector 802 may have an address signal input terminal. The address signal input terminal may be electrically connected to an address signal line. An address signal inputted from the address signal input terminal may be used to control the first signal selector 802 to transmit, to an output terminal of the first signal selector 802, a signal transmitted to which signal input terminal of the first signal selector. An address signal on the address signal line and a control signal for controlling a working time of each of the photoelectric signal receivers may match each other.

The output terminal of the first signal selector 802 is electrically connected to a signal input terminal of the signal amplifier 803. In some application scenarios, a signal outputted by the photoelectric signal receiver 801 may be a current signal, and the signal amplifier 803 may convert, to a voltage signal, the current signal inputted to the signal amplifier, and amplify the voltage signal. In some application scenarios, a signal outputted by the photoelectric signal receiver 801 may be a voltage signal, and the signal amplifier 803 may amplify the voltage signal inputted to the signal amplifier and outputted by the photoelectric signal receiver. Generally, the voltage signal outputted by the signal amplifier 803 is a continuous voltage signal.

The voltage comparator 804 is configured to convert, to a pulse voltage signal, the continuous voltage signal outputted by the signal amplifier 803. The voltage comparator 804 has a first input terminal and a second input terminal. An output terminal of the signal amplifier 803 is electrically connected to the first input terminal of the voltage comparator 804, and the second input terminal of the voltage comparator 804 is electrically connected to a preset threshold voltage signal line. A threshold voltage transmitted on the preset threshold voltage signal line may be changed according to application scenarios.

In some application scenarios, the plurality of photoelectric signal receivers 801 may be disposed on the same carrier. 2 first signal selectors 802, 2 signal amplifiers 803, and 2 voltage comparators 804 may be further disposed on the carrier. In these application scenarios, the plurality of photoelectric signal receivers 801 may be divided into 2 groups. Each group of the photoelectric signal receivers 801 corresponds to one first signal selector 802. For example, if a total number of photoelectric signal receivers 801 is 16, the 16 photoelectric signal receivers 801 may be divided into 2 groups each having 8 photoelectric signal receivers 801. Each group of 8 photoelectric signal receivers 801 correspond to one first signal selector 802. Output terminals of each group of photoelectric signal receivers 801 are respectively connected to signal input terminals of the first signal selector 802 corresponding to the group of photoelectric connectors 801 in a one-to-one manner. The output terminal of the first signal selector 802 may be electrically connected to a signal input terminal of one signal amplifier 803. The signal amplifier 803 may have an enable signal input terminal. An output terminal of each of the signal amplifiers 803 may be electrically connected to the first input terminal of the voltage comparator 804. The second input terminal of the voltage comparator 803 is electrically connected to a preset threshold voltage signal line.

In this way, in the signal receiving circuit of the Lidar system, the first signal selector is used between the plurality of photoelectric signal receivers and the signal amplifier, so that electrical signals outputted by the different photoelectric signal receivers may be inputted to a smaller number of signal amplifiers in a preset order. Compared with disposing one signal amplifier for each photoelectric signal receiver in the Lidar system, the solution provided in this embodiment reduces a number of signal amplifiers that are used, reduces costs of the Lidar system, and facilitates further promotion of the Lidar system.

Figure 28:
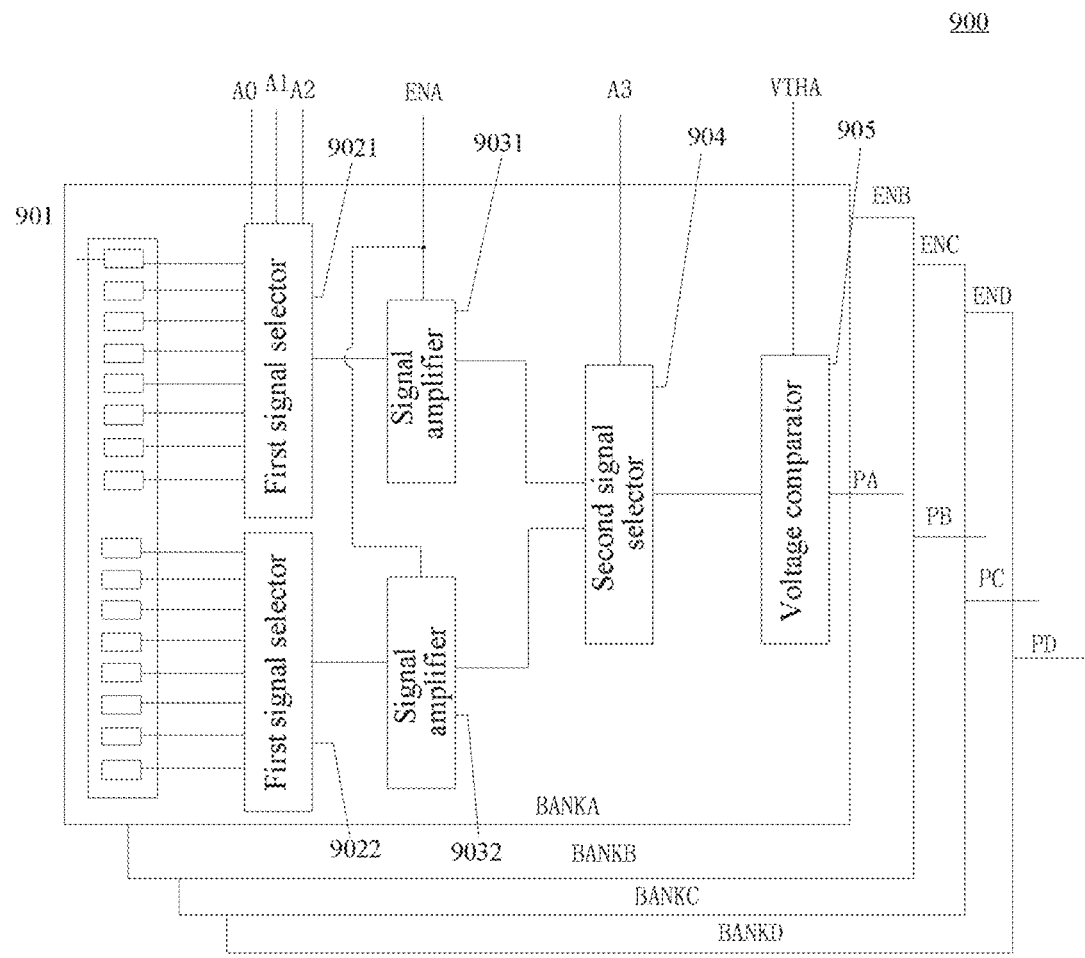
FIG. 28 is another structural diagram of a receiving circuit of the Lidar system according to an embodiment of this application.

FIG. 28 is another structural diagram of a receiving circuit of the Lidar system according to an embodiment of this application.

Similar to the embodiment shown in FIG. 27, a receiving circuit 900 of the Lidar system shown in FIG. 28 includes a plurality of photoelectric signal receivers 901, a first signal selector, a signal amplifier, and a voltage comparator 905.

Different from FIG. 27, in this embodiment, the plurality of photoelectric signal receivers 901, the at least one signal amplifier, and the at least one voltage comparator are divided into at least two receiving circuit subgroups.

Each of the receiving circuit subgroups may include at least two photoelectric signal receivers 901, at least one signal amplifier, and a voltage comparator 905. The at least two photoelectric signal receivers 901 and the at least one signal amplifier are electrically connected through the at least one first signal selector.

In this embodiment, a number of first signal selectors may be 2, 3, or other numbers. The number of first signal selectors may be less than a number of photoelectric signal receivers.

For each of the receiving circuit subgroups, for a connection relationship between the photoelectric signal receivers, a first signal selector, the signal amplifier, and the voltage comparator thereon, refer to the description of the embodiment shown in FIG. 27, and details are not described herein.

In some application scenarios, the plurality of photoelectric signal receivers 901, the at least one signal amplifier, and the at least one voltage comparator 905 are divided into four receiving circuit subgroups (BANKA, BANKB, BANKC, and BANKD shown in FIG. 28). Each of the receiving circuit subgroups (for example, BANKA) includes at least two photoelectric signal receivers 901, at least one signal amplifier, and a voltage comparator 905. The at least two photoelectric signal receivers 901 and the at least one signal amplifier are electrically connected through at least one first signal selector. A number of signal amplifiers may be one, two, or more. The number of signal amplifiers may be less than a number of photoelectric signal receivers 901.

In this embodiment, each of the receiving circuit subgroups (for example, BANKA shown in FIG. 28) may further include a second signal selector 904. Output terminals of signal amplifiers included in the receiving circuit subgroup (for example, BANKA) are electrically connected to signal input terminals of the second signal selector 904 in a one-to-one manner. An output terminal of the second signal selector 904 is electrically connected to a first input terminal of the voltage comparator 905 of the receiving circuit subgroup. A second input terminal of the voltage comparator 905 is electrically connected to a preset threshold voltage signal line VTHA. It is understandable that, a corresponding preset threshold voltage signal line for the receiving circuit subgroup BANKB is VTHB, a corresponding preset threshold voltage signal line for the receiving circuit subgroup BANKC is VTHC, and a corresponding preset threshold voltage signal line for the receiving circuit subgroup BANKD is VTHD. However, BANKB, BANKC, and BANKD are not illustrated one by one as a result of being blocked by BANKA. For specific solutions thereof, those skilled in the art may refer to the illustration of BANKA for understanding. Structural diagrams of BANKB, BANKC, and BANKD are the same as that of BANKA. In addition, since the receiving circuit subgroups BANKA, BANKB, BANKC, and BANKD are sequentially arranged in a vertical direction and the receiving circuit subgroups at different positions in the vertical direction may have different obstacle detection requirements, VTHA, VTHB, VTHC and VTHD may be different.

In some application scenarios, the number of photoelectric signal receivers 901 included in the signal receiving circuit of the Lidar system is 64. Each receiving circuit subgroup may include 16 photoelectric signal receivers 901, 2 first signal selectors, 2 signal amplifiers, 1 second signal selector 904, and 1 voltage comparator 905. Output terminals of first 8 photoelectric signal receivers 901 of the 16 photoelectric signal receivers 901 are electrically connected to signal input terminals of a first signal selector 9021 in a one-to-one manner. Output terminals of last 8 photoelectric signal receivers 901 are electrically connected to signal input terminals of another first signal selector 9022 in a one-to-one manner. The first signal selector 9021 and the other first signal selector 9022 each have an address signal input terminal. In some application scenarios, the address signal input terminals of the first signal selector 9021 and the other first signal selector 9022 each may be electrically connected to address signal lines A0, A1, and A2. Signals transmitted on the address signal lines A0, A1, and A2 are used to determine which input signals are selected by the first signal selector 9021 and the other first signal selector 9022 as output. In other application scenarios, an address signal line corresponding to the address signal input terminal of the first signal selector 9021 and an address signal line corresponding to the address signal input terminal of the other first signal selector 9022 may be independent of each other. In this way, a more independent choice can be made.

The output terminals of the first signal selector 9021 are electrically connected to a signal input terminal of a first signal amplifier 9031. The output terminals of the other first signal selector 9022 is electrically connected to a signal input terminal of a second signal amplifier 9032. An output terminal of the first signal amplifier 9031 and an output terminal of the second signal amplifier 9032 are electrically connected to the signal input terminals of the second signal selector 904 respectively.

The first signal amplifier 9031 and the second signal amplifier 9032 each have an enable signal input terminal. The enable signal input terminal is electrically connected to an enable signal line. An enable signal line for BANKA is ENA shown in FIG. 28. An enable signal line for BANKB is ENB shown in FIG. 28. An enable signal line for BANKC is ENC shown in FIG. 28. An enable signal line for BANKD is END shown in FIG. 28. The second signal selector 904 has an address signal input terminal. The address signal input terminal is electrically connected to the address signal line A3.

The output terminal of the second signal selector 904 is electrically connected to the first input terminal of the voltage comparator 905. The second input terminal of the voltage comparator 905 is electrically connected to the preset threshold voltage signal line VTHA. Through the voltage comparator 905, BANKA outputs a pulse voltage signal PA, BANKB outputs a pulse voltage signal PB, BANKC outputs a pulse voltage signal PC, and BANKD outputs a pulse voltage signal PD.

For each BANK (for example, BANKA), a plurality of photoelectric signal receivers 901 of BANK may be arranged in a photoelectric signal receiver array (for example, a single row shown in FIG. 28). 16 optoelectronic signals from the optoelectronic signal receiver array first pass through two 8-channel signal selectors 9021 and 9022, then enter the two wideband signal amplifiers 9031 and 9032, and then pass through the 2-channel signal selector 904 to be combined into one signal (alternatively, one of the signals is selected), which enters the voltage comparator 905 and is compared with the threshold VTHA. If the signal is greater than the threshold VTHA, a pulse signal is outputted and then converted to a low-voltage differential signal for subsequent analysis and processing.

In addition, a threshold VTHA may vary for a path formed by each of the photoelectric signal receivers 901, this is because different paths may correspond to different detection requirements. In each photoelectric signal receiver array, at any time, a signal generated by one of the photoelectric signal receivers may be selected for amplification and comparison, and the threshold VTHA of the comparator may be dynamically adjusted. The threshold VTHA may be related to a preset detection distance of the Lidar system, for example. For a nearby target or a high-reflection target, an echo signal is so strong that a pulse width of the signal amplifier cannot reflect a strength of the echo signal. In this case, the threshold needs to be properly lowered to obtain reflectivity information. In other words, a lower the preset detection distance indicates a higher threshold, and a higher the preset detection distance indicates a lower threshold.

Referring to FIG. 28, the photoelectric signal receivers of BANKA, BANKB, BANKC, and BANKD are sequentially arranged in a vertical direction. For photoelectric signal receivers in BANKA on opposite edges, a possible detection requirement is large distance measurement, that is, measurement of a distance as large as possible. In this case, a threshold VTHA corresponding to photoelectric signal receivers in BANKA is relatively low. Similarly, for an optoelectronic receiving unit in BANKB at a relatively central position, a detection requirement may be a relatively high density but a relatively small distance. In this case, a threshold voltage VTHB corresponding to the optoelectronic receiving unit in BANKB is relatively high.

The signal amplifier has an enable signal input terminal (a control switch). The signal amplifier is controlled by using an enable signal (for example, enable signals transmitted on the enable signal lines ENA, ENB, and EBC shown in FIG. 28), and therefore may be controlled to be turned off when there will be no detection, so that power consumption can be reduced. Since it takes 1-2 us for the signal amplifier to recover from a low power consumption state, the enable signal needs to be given in advance. For example, the signal amplifier needs to start working at a moment t2. The enable signal may be designed to be transmitted to the signal amplifier at a time point of (t2−[1-2 us]), so that the signal amplifier can start to work on time at t2.

Compared with the embodiment shown in FIG. 27, in this embodiment, the signal receiving circuit in the Lidar system is divided into at least two receiving circuit subgroups each including at least two photoelectric signal receivers, at least one first signal selector, and at least one voltage comparator, which can increase a speed of the echo signal for the received detection signal. Not only the costs of the Lidar system can be reduced, but also a response speed of the Lidar system can be ensured, thereby facilitating further promotion of the Lidar system.

In addition, an embodiment of this application further provides a Lidar system. The Lidar system includes a signal emitting apparatus and a signal receiving apparatus. The signal receiving apparatus includes the signal receiving circuit of the Lidar system provided in the embodiment shown in FIG. 21 or FIG. 22. The Lidar system may include other features mentioned in the first aspect, the second aspect, the third aspect, and the fourth aspect of this application, for example.

Figure 29:
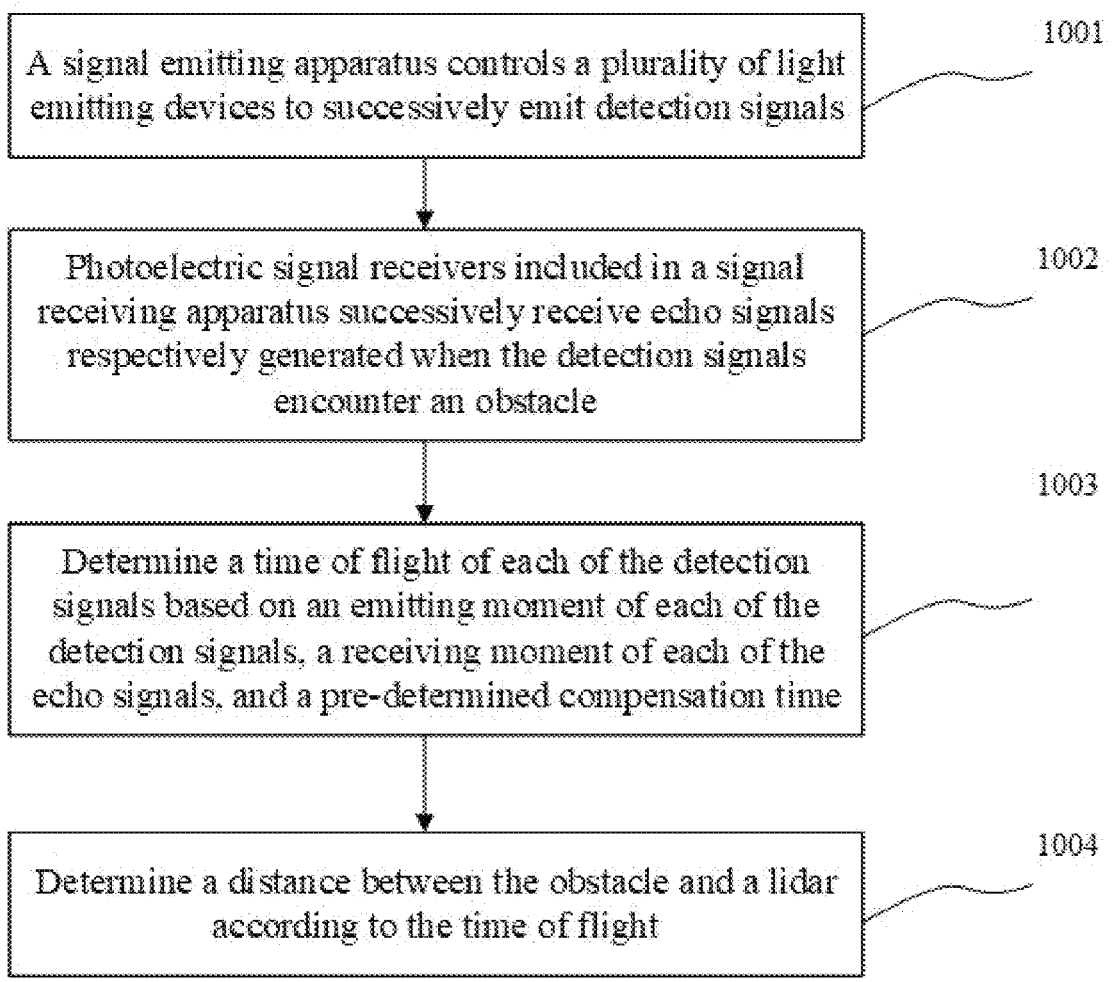
FIG. 29 is a schematic flowchart of a Lidar system ranging method according to an embodiment of this application.

FIG. 29 is a schematic flowchart of a Lidar system ranging method according to an embodiment of this application.

As shown in FIG. 29, a Lidar system ranging method 1000 includes the following steps:

At Step 1001, the signal emitting apparatus controls a plurality of light emitting devices to successively emit detection signals.

At Step 1002, photoelectric signal receivers included in the signal receiving apparatus successively receive echo signals respectively generated when the detection signals encounter an obstacle.

At Step 1003, determine a time of flight of each of the detection signals based on an emitting moment of each of the detection signals, a receiving moment of each of the echo signals, and a pre-determined compensation time.

At Step 1004, determine a distance between the obstacle and the Lidar system according to the time of flight.

The time of flight (ToF) of each of the detection signals herein may be regarded as a time interval between the moment of emitting the detection signal and the moment of receiving the echo signal formed when the detection signal encounters an obstacle.

For each of the detection signal, a product of a time of flight of the detection signal and the speed of light may be regarded as a distance between the Lidar system and the obstacle.

The compensation time is mainly used to compensate for a deviation of the time of flight caused by a parasitic capacitance in the receiving circuit of the Lidar system. The parasitic capacitance may be caused by the first signal selector and/or the second signal selector.

The receiving circuit of the Lidar system generates a parasitic capacitance. The existing parasitic capacitor consumes a voltage. As a result, a rising moment of a rising edge of a pulse signal voltage outputted by the voltage comparator is later than a rising moment of a rising edge of the pulse voltage signal theoretically generated by the echo signal when the signal receiving circuit has no parasitic capacitance. Therefore, an actual time of flight of the detection signal is less than a measured time of flight of the detection signal. As a result, the distance between the Lidar system and the obstacle measured by the Lidar system is inaccurate.

A calibration test method may be used to measure a time difference between the rising moment of the rising edge of the pulse signal voltage outputted by the voltage comparator and the rising moment of the rising edge of the pulse voltage signal theoretically generated by the echo signal when the signal receiving circuit has no parasitic capacitance, and the time difference is used as the compensation time. During calculation of the time of flight of the detection signal, a difference between the time interval between a reference moment when the light emitting device emits the detection signal and the moment of receiving the echo signal generated when the detection signal encounters the obstacle and the compensation time is determined as the time of flight of the detection signal used to calculate the distance.

An embodiment of this application further provides a signal processing method applicable to the Lidar system. The method includes:

converting a received optical signal to an electrical signal through a plurality of photoelectric signal receivers;

successively outputting, to signal amplifier through the first signal selector, electrical signals outputted by the photoelectric signal receivers of the plurality of photoelectric signal receivers;

amplifying the received electrical signals through an amplifier; and comparing the amplified electrical signals with a threshold voltage through a voltage comparator, and outputting a pulse voltage signal according to a comparison result.

The threshold voltage is related to a detection requirement of the Lidar system.

The fifth aspect of this application relates to the receiving circuit of the Lidar system and the signal processing method for the receiving terminal. The receiving circuits 800 and 900 and the signal processing method may be combined with the Lidar systems of the first, second, third, and fourth aspects of this application, for example, used as the receiving circuits of the Lidar systems and the signal processing method. For example, referring to FIG. 7 and FIG. 8, a photoelectric processing device 704 is disposed outside a rear end of the receiving support 702, and the photoelectric processing device 704 includes a receiving circuit board 704A and a plurality of photoelectric sensor elements 704B disposed on the receiving circuit board. The photoelectric signal receivers 801 and 901 in the receiving circuit of the fifth aspect of this application may be used as the photoelectric sensor elements 704B in FIG. 8. In addition, for example, other devices of the receiving circuit of the fifth aspect of this application, such as the signal generator, the first signal selector, the second signal selector, and the voltage comparator may also be integrated on the receiving circuit board 704A. In this way, the technical solutions and the signal processing method for the receiving circuit of the Lidar system of the fifth aspect of this application can be combined into the above Lidar system of the various embodiments of the other described aspects. In addition, the technical solution and the signal processing method for the receiving circuit of the Lidar system in the fifth aspect of this application may be easily combined with the technical solution and the signal processing method for the emitting circuit of the Lidar system in the fourth aspect of this application. This combination is easily understood for those skilled in the art and does not require creative work. Details are not described herein again.

In the drawings, some structural or method features may be shown in a specific arrangement and/or order. However, it should be understood that such specific arrangement and/or order may be not required. Instead, in some embodiments, these features may be arranged in a different manner and/or order than those shown in the illustrative drawings. In addition, the inclusion of the structural or method features in a particular figure does not imply that such features are required in all embodiments, and in some embodiments, these features may not be included or may be combined with other features.

It would be appreciated that, relational terms in the examples and description of this patent such as first and second are merely used to distinguish one entity or operation from another entity or operation rather than necessarily requiring or implying any such practical relationship or order between these entities or operations. Furthermore, terms "comprise", "include" or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "comprising one" does not exclude existence of other same elements in the process, the method, the article, or the device that includes the elements.

It would be appreciated that, relational terms in the examples and description of this patent such as first and second are merely used to distinguish one entity or operation from another entity or operation rather than necessarily requiring or implying any such practical relationship or order between these entities or operations. Furthermore, terms "comprise", "include" or any other variants are intended to encompass non-exclusive inclusion, such that a process, a method, an article or a device including a series of elements not only include those elements, but also includes other elements not listed explicitly or includes intrinsic elements for the process, the method, the article, or the device. Without any further limitation, an element defined by the phrase "comprising one" does not exclude existence of other same elements in the process, the method, the article, or the device that includes the elements.

Although this application has been illustrated and described with reference to some preferred embodiments of this application, those of ordinary skill in the art should understand that various changes may be made in forms and details without departing from the spirit and the scope of this application.

What is claimed is:

1. A LiDAR, comprising:
a detection device; and
a flat platform, wherein the detection device is rotatably fixed on the flat platform,
wherein the detection device comprises:
a lens tube;
a light beam emitting device;
an emitting lens assembly;
a receiving lens assembly;
a light isolating plate; and
a photoelectric processing device,
wherein the lens tube comprises an emitting support and a receiving support that are separable,
wherein the emitting lens assembly is located on a light path of a detection light beam emitted by the light beam emitting device,
wherein the light beam emitting device comprises an emitting circuit board and a plurality of emitting light sources arranged on the emitting circuit board,
wherein the receiving lens assembly is located on a light path of an echo light beam received by the photoelectric processing device,
wherein the photoelectric processing device comprises a receiving circuit board and a plurality of photoelectric sensing elements arranged on the receiving circuit board,
wherein the emitting support and the receiving support extend in directions parallel to each other, and the emitting lens assembly is located inside the emitting support and the receiving lens assembly is located inside the receiving support,
wherein the emitting support and the receiving support are two independent supports and detachable from each other, wherein the emitting support has a first open side facing a first side of the light isolating plate, and the receiving support has a second open side facing a second side of the light isolating plate, the first side being opposite to the second side, and wherein the light isolating plate is disposed between the emitting support and the receiving support, parallel to the directions in which the emitting support and the receiving support extend, and the light isolating plate is detachable from at least one of the emitting support or the receiving support,
wherein the emitting support comprises an emitting hole, and the LiDAR further comprises an emitting light shielding plate on an end surface of a front end of the emitting support, and wherein the emitting light shielding plate and the emitting hole are located on the first side of the light isolating plate, and
wherein the receiving support comprises a receiving hole, and the LiDAR further comprises a receiving light shielding plate on an end surface of a front end of the receiving support, and wherein the receiving light shielding plate and the receiving hole are located on the second side of the light isolating plate.

2. The LiDAR of claim 1, wherein the light beam emitting device comprises m×n emitting light sources arranged on the emitting circuit board, and
wherein the photoelectric processing device comprises i×j photoelectric sensing elements arranged on the receiving circuit board,
where m, n, i, j are integers greater than 1.

3. The LiDAR of claim 2, wherein the m×n emitting light sources are arranged on the emitting circuit board and staggered along a vertical direction, and
wherein the i×j photoelectric sensing elements are arranged on the receiving circuit board and correspondingly staggered along the vertical direction.

4. The LiDAR of claim 2, wherein the light beam emitting device and the photoelectric processing device are configured to have at least one of:
one or more emitting light sources being in one-to-one correspondence with one or more photoelectric sensing elements,
one emitting light source corresponding to multiple photoelectric sensing elements, or multiple emitting light sources corresponding to one of the photoelectric sensing elements.

5. The LiDAR of claim 1, further comprising a communication assembly,
wherein a main shaft of the flat platform is configured as a hollow structure, and the communication assembly is disposed inside the main shaft.

6. The LiDAR of claim 5, wherein the communication assembly comprises a first communication circuit and a second communication circuit,
wherein the first communication circuit is fixed relative to the detection device, and the second communication circuit is fixed relative to a base of the flat platform, and
wherein the first communication circuit comprises at least one light emitting element, the second communication circuit comprises at least one photoelectric sensing element, and the at least one photoelectric sensing element of the second communication circuit is located on a light path of a light beam emitted by the at least one light emitting element of the first communication circuit.

7. The LiDAR of claim 6, wherein the second communication circuit further comprises at least one light emitting element, the first communication circuit further comprises at least one photoelectric sensing element, and
wherein the at least one photoelectric sensing element of the first communication circuit is located on a light path of a light beam emitted by the at least one light emitting element of second communication circuit.

8. The LiDAR of claim 7, wherein a wavelength of the light beam emitted by the at least one light emitting element of the first communication circuit is different from a wavelength of the light beam emitted by the at least one light emitting element of the second communication circuit.

9. The LiDAR of claim 1, wherein the flat platform comprises an upper cartridge plate, a lower cartridge plate, a base, and a main shaft, and
wherein a first end of the main shaft is connected with the upper cartridge plate, and a second end of the main shaft is connected with the base.

10. The LiDAR of claim 9, wherein the main shaft is arranged perpendicular to the base, and is located between the upper cartridge plate and the base or between the upper cartridge plate and the lower cartridge plate.

11. The LiDAR of claim 9, wherein the upper cartridge plate is fixedly arranged relative to the detection device, and the upper cartridge plate is closer to the base than to a top cover of the LiDAR in an axial direction of the detection device.

12. The LiDAR of claim 9, wherein the flat platform further comprises a rotatory support configured to be sleeved on the main shaft and to support the detection device, and
wherein the rotatory support is drivable to rotate the detection device around the main shaft for 360°.

13. The LiDAR of claim 9, wherein the flat platform further comprises a wireless power supply assembly located between the upper cartridge plate and the lower cartridge plate.

14. The LiDAR of claim 13, wherein the wireless power supply assembly comprises:
a transmitting circuit board disposed around the main shaft, and
a receiving circuit board disposed around the main shaft,
wherein the transmitting circuit board is fixedly disposed relative to the main shaft, and the receiving circuit board is configured to rotate around the main shaft.

15. The LiDAR of claim 13, wherein the wireless power supply assembly comprises a wireless transmitting coil and a wireless receiving coil that are arranged around the main shaft,
wherein the wireless transmitting coil and the wireless receiving coil are configured to supply power to a driving motor and the detection device.

16. The LiDAR of claim 15, wherein the driving motor is arranged around the main shaft, and a rotor of the driving motor is configured to rotate around the main shaft, thereby driving the detection device to rotate around the main shaft.

17. The LiDAR of claim 15, wherein the driving motor and the wireless power supply assembly are arranged sequentially farther away from the main shaft.

18. The LiDAR of claim 1, wherein the emitting circuit board is located outside the emitting support and arranged at a rear end of the emitting support that is opposite to a front end of the emitting support from which the detection light beam emits, and
wherein the receiving circuit board is located outside the receiving support and is arranged at a rear end of the receiving support that is opposite to a front end of the receiving support for receiving the echo light beam.

19. The LiDAR of claim 1, wherein the emitting support and the receiving support are symmetrically disposed relative to the light isolating plate.

20. The LiDAR of claim 1, wherein the emitting light shielding plate is detachable from the emitting support and perpendicular to the end surface of the front end of the emitting support, and
wherein the receiving light shielding plate is detachable from the receiving support and perpendicular to the end surface of the front end of the receiving support.

21. The LiDAR of claim 1, wherein the emitting light shielding plate and the receiving light shielding plate are spaced from each other.

22. A method of controlling a LIDAR, the method comprising:
receiving a detection instruction;
performing a detection task according to the detection instruction; and
generating a detection result; and
analyzing and processing the detection result,
wherein the LiDAR comprises a detection device and a flat platform, wherein the detection device is rotatably fixed on the flat platform,
wherein the detection device comprises: a lens tube, a light beam emitting device, an emitting lens assembly, a receiving lens assembly, a light isolating plate, and a photoelectric processing device, and wherein the lens tube comprises an emitting support and a receiving support that are separable,
wherein the emitting lens assembly is located on a light path of a detection light beam emitted by the light beam emitting device, and wherein the light beam emitting device comprises an emitting circuit board and a plurality of emitting light sources arranged on the emitting circuit board,
wherein the receiving lens assembly is located on a light path of an echo light beam received by the photoelectric processing device, and wherein the photoelectric processing device comprises a receiving circuit board and a plurality of photoelectric sensing elements arranged on the receiving circuit board,
wherein the emitting support and the receiving support extend in directions parallel to each other, the emitting lens assembly is located inside the emitting support and the receiving lens assembly is located inside the receiving support,
wherein the emitting support and the receiving support are two independent supports and detachable from each other, wherein the emitting support has a first open side facing a first side of the light isolating plate, and the receiving support has a second open side facing a second side of the light isolating plate, the first side being opposite to the second side, and wherein the light isolating plate is disposed between the emitting support and the receiving support, parallel to the directions in which the emitting support and the receiving support extend, and the light isolating plate is detachable from at least one of the emitting support or the receiving support,
wherein the emitting support comprises an emitting hole, and the LiDAR further comprises an emitting light shielding plate on an end surface of a front end of the emitting support, and wherein the emitting light shielding plate and the emitting hole are located on the first side of the light isolating plate, and
wherein the receiving support comprises a receiving hole, and the LiDAR further comprises a receiving light shielding plate on an end surface of a front end of the receiving support, and wherein the receiving light shielding plate and the receiving hole are located on the second side of the light isolating plate.

23. The method of claim 22, comprising:
according to the detection instruction, controlling, by the emitting circuit board in the detection device, the plurality of emitting light sources to emit the detection light beam to a space to be tested; and according to the detection instruction, receiving, by the plurality of photoelectric sensing elements on the receiving circuit board, the echo light beam, and performing, by the plurality of photoelectric sensing elements, photoelectric conversion on the echo light beam to generate the detection result.

\* \* \* \* \*